Feb. 7, 1961  G. F. DALY ET AL  2,970,751
CARD HANDLING APPARATUS
Filed Dec. 30, 1957  13 Sheets-Sheet 1
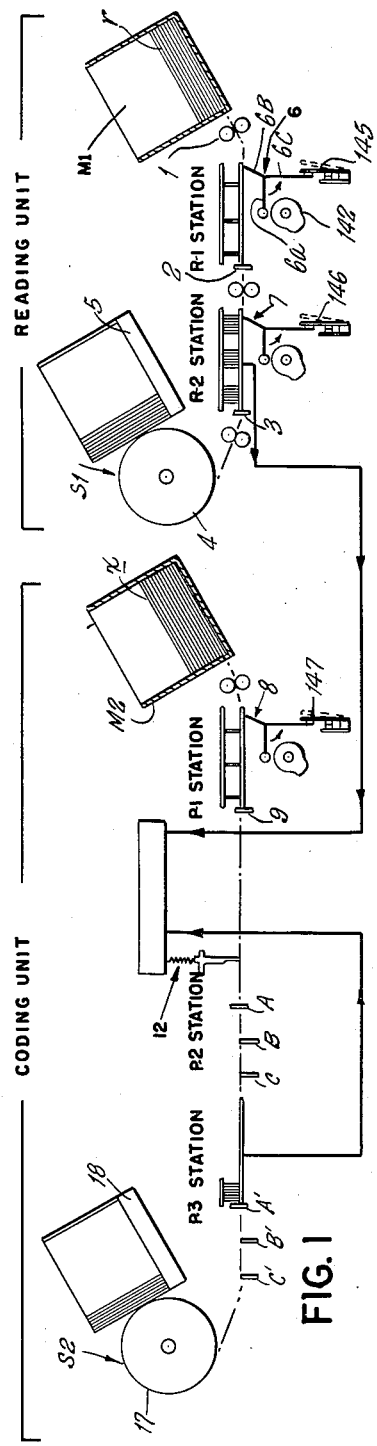
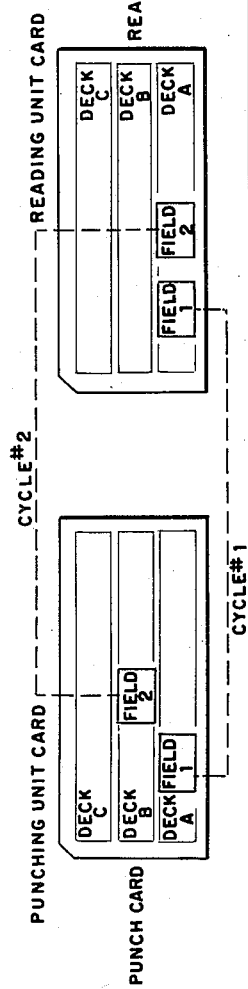
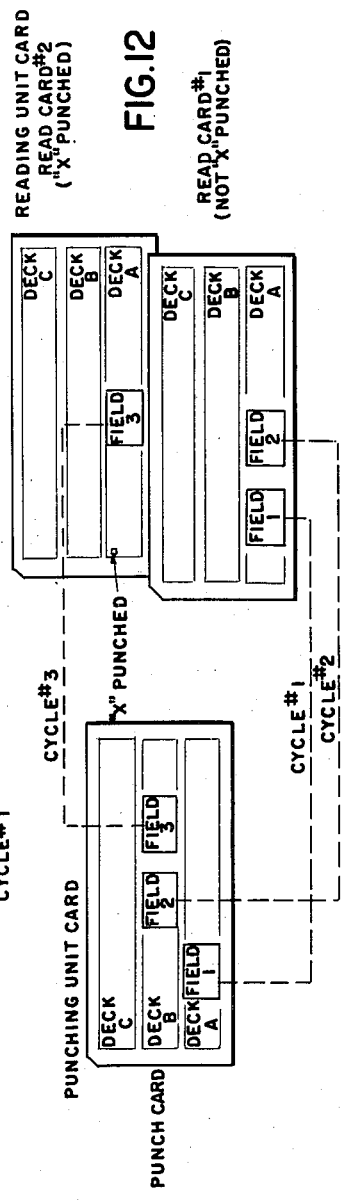
INVENTORS
George F. Daly
BY James A. Weidenhammer
ATTORNEYS

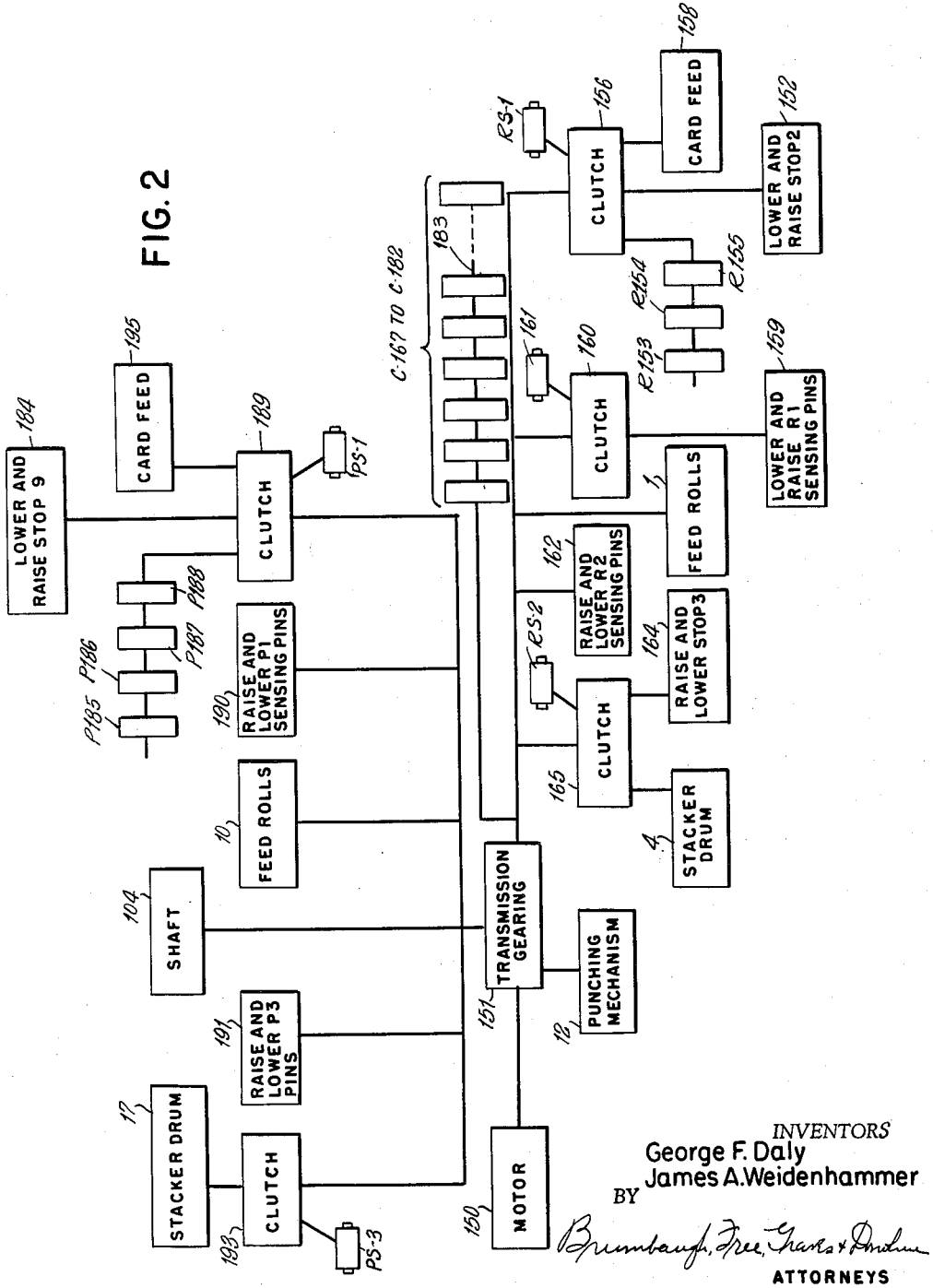

Feb. 7, 1961 G. F. DALY ET AL 2,970,751
CARD HANDLING APPARATUS
Filed Dec. 30, 1957 13 Sheets-Sheet 3

INVENTORS
George F. Daly
BY James A. Weidenhammer

ATTORNEYS

Feb. 7, 1961 G. F. DALY ET AL 2,970,751
CARD HANDLING APPARATUS
Filed Dec. 30, 1957 13 Sheets-Sheet 6

INVENTORS
George F. Daly
BY James A. Weidenhammer

ATTORNEYS

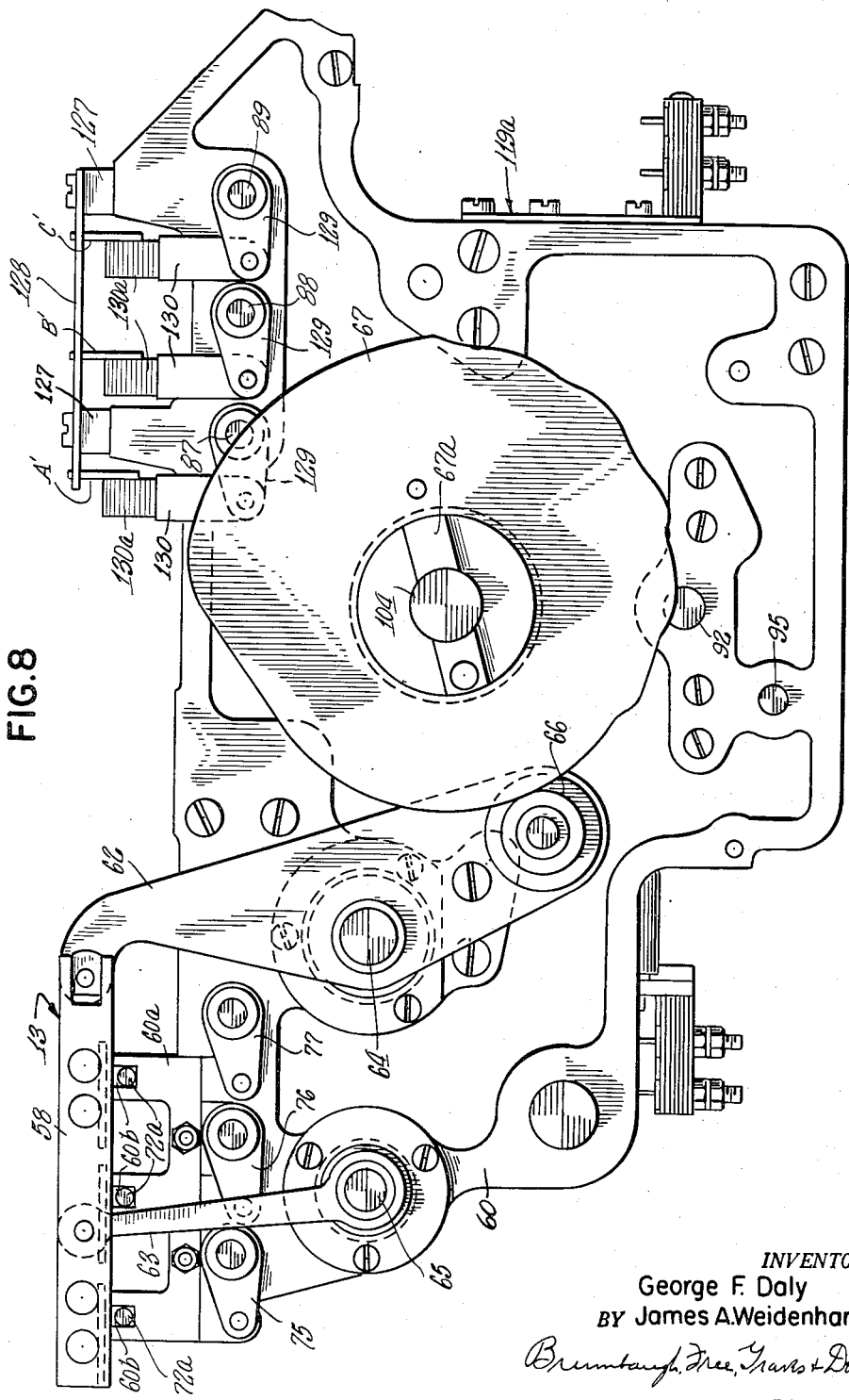

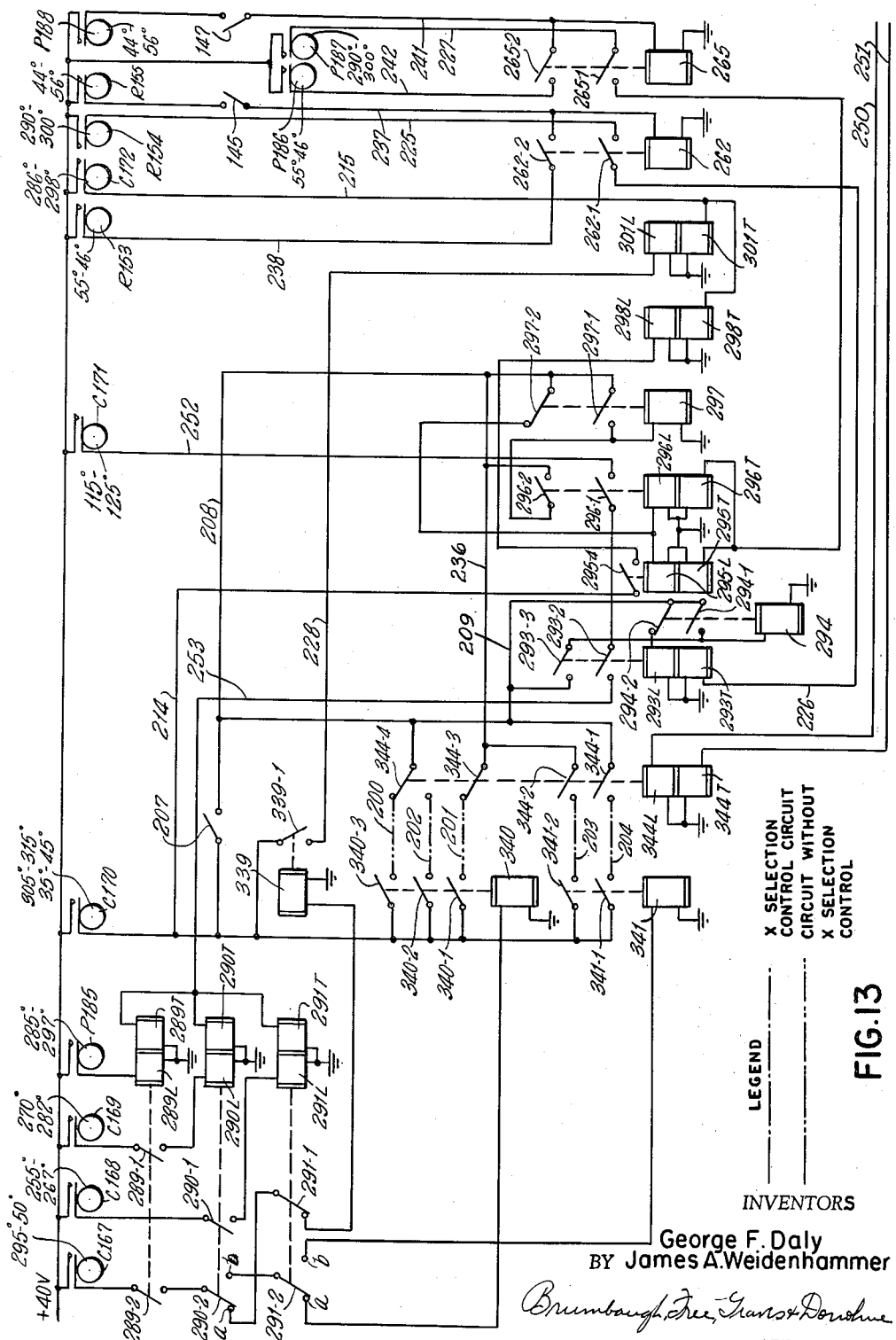

Feb. 7, 1961  G. F. DALY ET AL  2,970,751
CARD HANDLING APPARATUS
Filed Dec. 30, 1957  13 Sheets-Sheet 10

FIG. 14

INVENTORS
George F. Daly
James A. Weidenhammer
BY
Brumbaugh, Free, Graves &
Donohue
ATTORNEYS Feb. 7, 1961  G. F. DALY ET AL  2,970,751
CARD HANDLING APPARATUS
Filed Dec. 30, 1957  13 Sheets-Sheet 11

FIG.15

INVENTORS
George F. Daly
James A. Weidenhammer
BY
Brumbaugh, Free, Graves & Donohue
ATTORNEYS Feb. 7, 1961 G. F. DALY ET AL 2,970,751
CARD HANDLING APPARATUS
Filed Dec. 30, 1957 13 Sheets-Sheet 13

CARD #2 PUNCHED TWICE IN A DECK, ONCE IN C DECK

CARD #3 PUNCHED IN A AND B DECKS

INVENTORS
George F. Daly
BY James A. Weidenhammer

ATTORNEYS

2,970,751

CARD HANDLING APPARATUS

George F. Daly, Endicott, and James A. Weidenhammer, Poughkeepsie, N.Y., assignors to International Business Machines Corporation, New York, N.Y., a corporation of New York Filed Dec. 30, 1957, Ser. No. 706,067

19 Claims. (Cl. 234—29)

This invention relates to a machine for handling record cards, particularly record cards of the type which are divided into a plurality of information receiving areas or decks, in which the record cards are fed to a station and selectively registered at such station by one of a plurality of card stops so as to present the desired areas in operative position with respect to said station.

In certain business systems, record cards are employed in which various information is stored therein in different areas or decks in the form of code perforations, each deck comprising a plurality of rows and columns of possible code receiving positions. Machines which handle these multi-deck record cards for coding and for sensing must be designed for rapid and efficient handling of the record cards, as well as for precision registration of the record cards relative to the coding or sensing station.

The principal object of the present invention, therefore, is to provide an improved apparatus for the rapid handling of record cards during the coding and/or sensing operations.

Another object of the present invention is the provision of a card handling apparatus including novel means for precision registering of record cards in such fashion that selected decks of record cards are presented at a given station and moved rapidly relatively thereto to permit the operative mechanism at said station to scan the selected decks.

Still another object of the present invention is the provision of a card handling apparatus in which record cards can be retained, in response to a code signal on a record card, at the station for successive cycles of operation of the operative mechanism.

These and other objects of the present invention are achieved by a card handling apparatus in which a plurality of card registering stops are selectively movable into the path of travel of a record card to present a desired area or deck of the record card in operative position relative to a station of the machine. Thereupon, translation is imparted to the stop to move the record card relative to the station, thereby enabling an operative mechanism to scan the entire selected area or deck of the record card. After the selected area or deck has been scanned, the card registering stop will either be retracted out of the path of the record card, permitting it to advance to another card registering stop or to another station, or the record card will be retained by the card registering stop for a succeeding cycle of operation of the mechanism.

For a complete understanding of the present invention, reference may be made to the detailed description which follows, and to the accompanying drawings in which:

Figure 1 is a schematic representation of the various stations of a machine designed for different types of coding and reproducing operations;

Figure 2 is a schematic representation of the drive means for the various components of the machine shown in Figure 1;

Figure 8 is an elevation view of the apparatus shown in Figure 7 as seen from the left;

Figure 11 is a face view of two record cards illustrating how coded information from one record card is selectively imposed in another in one type of operation for which the present invention is designed;

Figure 12 is a view similar to Figure 11 but illustrating how coded information from two different record cards is selectively imposed in a third card in another type of operation for which the present invention is designed;

Figure 16:
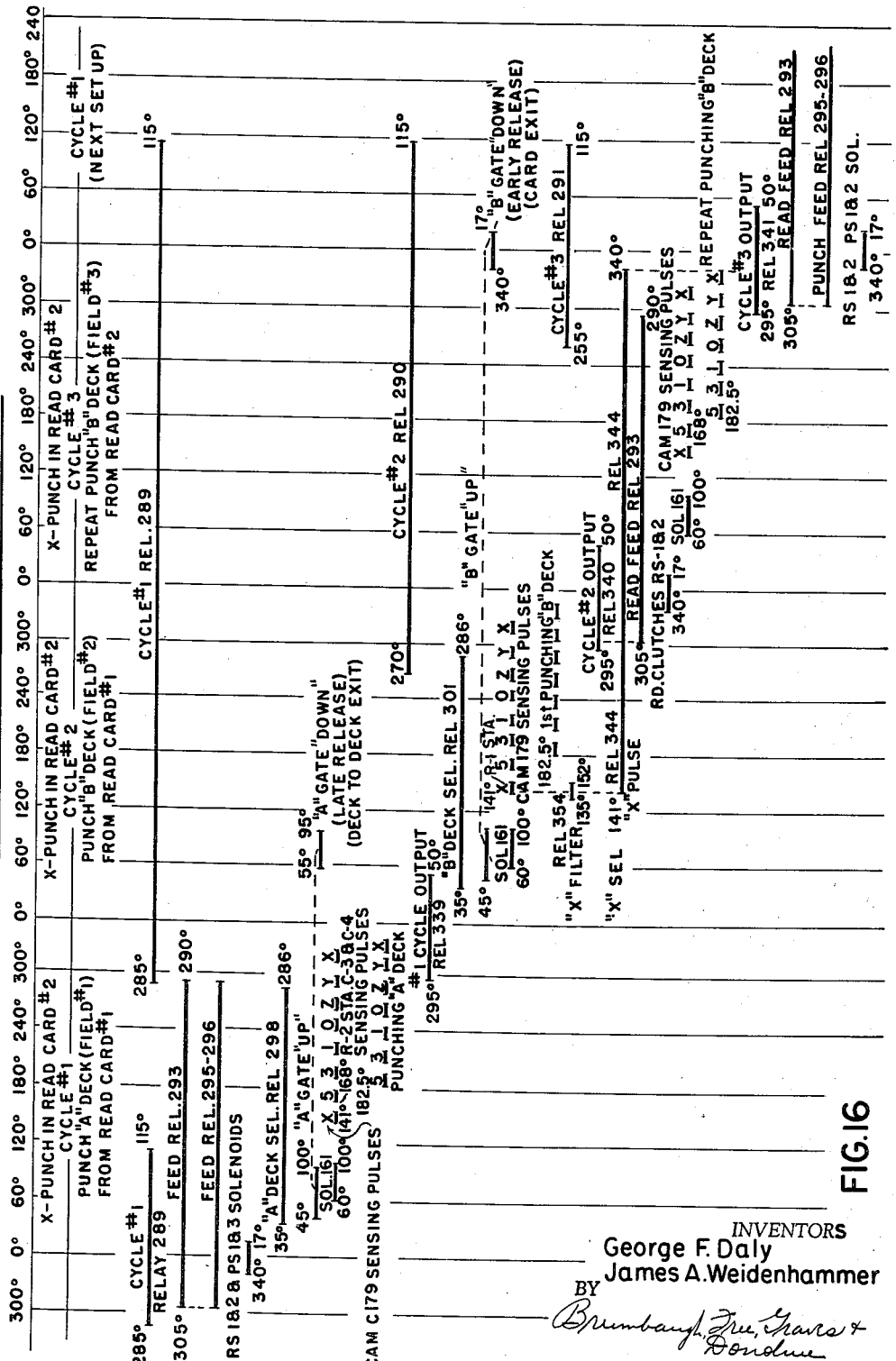
Figure 17:
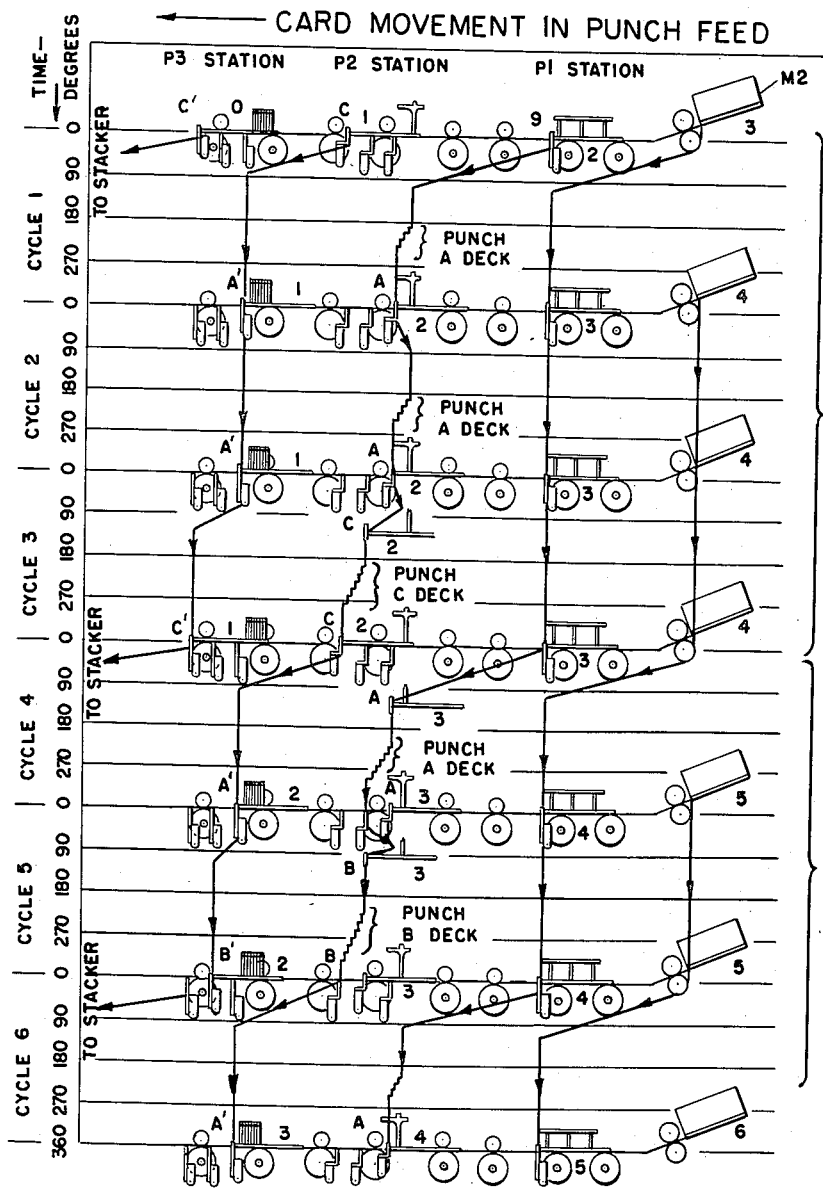

Figures 13 and 14 taken together illustrate the electrical control system for the machine;

Figures 15 and 16 are timing charts showing the sequence and duration of operation of certain of the components of the control system; and Figure 17 is a schematic view illustrating the progress of a series of typical record cards over a period of six cycles of operation.

GENERAL DESCRIPTION

The machine, as schematically represented in Figure 1, is designed for reproducing, gang punching and summary punching operations, or any combination of these three operations. The machine, for example, is particularly adapted for use in tabulating operations.

In general, the machine illustrated in Figure 1 includes two separate card handling units, namely, a reading unit (shown at the right) and a coding or punching unit (shown at the left). The reading unit includes a magazine M1, reading or sensing stations R1 and R2, and a stacker mechanism, generally designated S1. The object of this unit is to sense punched record cards $r$ for reproducing and control operations.

The punching unit includes a magazine M2, a reading or sensing station P1, a punching station P2, a reading or sensing station P3, and a stacker mechanism, generally designated S2. The object of this unit is to code or punch information in a series of record cards $x$ under the control of information read from the record cards $r$ at one of the sensings of the reading unit or under the control of information read from the record cards $x$ at one of the sensing stations of the punching unit.

Figure 4:
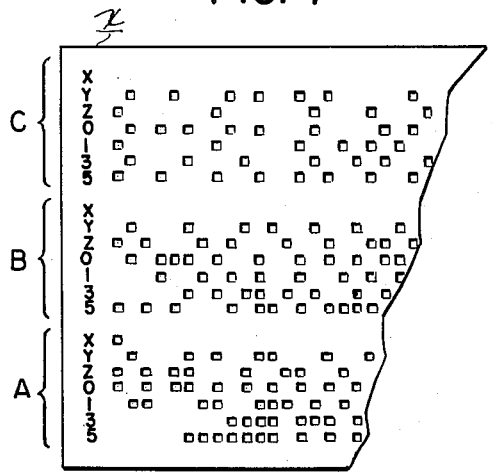
Figure 4 is a fragmentary face view of a three-deck record card.

Both the record cards $r$ and $x$ handled by the reading and punching units are multiple-deck record cards which use the seven element V-12 code illustrated in Figure 1 of the Beattie patent, No. 2,528,411, granted October 31, 1950. A typical record card is illustrated in Figure 4 of the drawings herein. This card comprises three decks, designated A, B and C, each having seven rows, X, Y, Z, 0, 1, 3 and 5, with sixty punching positions in each row.

The machine illustrated in Figure 1 can be converted to different types of operation by modifying the control circuits. The basic control circuitry is built into the machine, but the conversion of the machine can be made very simply by changing the plugging of the control panel of the machine. Certain plugging modifications which are germane to the present invention will be described below in connection with the control circuit shown in Figures 13 and 14 of the drawings. For example, when the machine is utilized for summary or gang punching of multiple-deck record cards, information is impressed in the record cards $x$ at the punching station P2 under the control of the reading or sensing station P3. When the machine is utilized for reproducing, the record cards $r$ are master control cards bearing information to be reproduced in the record cards $x$. In this application, the information sensed in a control card at the reading or sensing station R2 is impressed in a blank card $x$ presented to the punching station P2.

At the punching station, the record cards $x$ are stopped and registered relative to the punching station P2 by three stops A, B and C which are selectively operated for movement into the path of travel of the record cards $x$. These stops each serve to register a different deck of a record card relative to the punching mechanism. Thus, for example, a record card whose leading edge is in registration with the raised stop A is in position to be punched in deck A; likewise, record cards registered by the stops B or C are positioned relative to the punching mechanism to receive information in their decks B or C, as the case may be.

In a particular adaptation of the machine to be described in detail below, provision is made for repetitive punching of selected decks of the record cards $x$ at the punching station P2 under the control of information contained in either the record cards $x$ or $r$. In selective repetitive punching, the selected stop A, B or C is maintained in operative position for a succeeding cycle of operation of the punching mechanism, so that additional information can be impressed in the same deck of the record card during the second cycle of operation. In this adaptation of the machine, the sensing stations P1 and R1 serve to detect a particular code which initiates the repeat punching cycle. Since this particular information is contained in the X row of a given deck of the record cards, the control which initiates repetitive punching is referred to herein as "X selection" or "X control."

The R1 and P1 sensing stations serve to detect the "X-punched" cards or, that is to say, the cards which have been coded to initiate a repeat punching cycle. Thus, for example, the "X-punch" in a card $r$ will be detected at the reading station R1 while a record card $x$ is being punched or coded at the punching station P2 under the control of information read from a record card $r$ at the sensing station R2. During the next cycle of operation of the machine, the record card at the reading station R2 will be fed to the stacking mechanism, the record card at the sensing station R1 will be advanced to the sensing station R2, and the record card $x$ will be retained at the punching station P2 to receive information in the same deck thereof during the next cycle of operation of the punching mechanism.

THE READING UNIT

The reading unit is essentially the same as the mechanism described in the Beattie et al. patent. Therefore, a detailed description of the reading unit is unnecessary herein.

In the reading unit, the record cards $r$ are discharged one at a time from the magazine M1 and advanced by feed rolls 1 to a retractable stop 2. The stop 2 registers the leading edge of the record card relative to the R1 sensing pins which are capable of detecting an "X-punch" in any of the three decks of the card so stationed. The record card remains at the sensing station R1 for one cycle of the machine, whereupon the stop 2 is lowered and the record card is advanced from the sensing station R1 to the card registering stop 3 of the sensing station R2. The stop 3 arrests the record card so as to register it with respect to the bank of R2 sensing pins which are capable of reading information from any or all of the three decks of the card. The information read from the card at the sensing station R2 is transmitted by well-known means to the punching mechanism at the punching station P2 so that the appropriate information will be coded into a record card $x$ positioned at that station. The record card remains at the sensing station R2 for one cycle of the machine, whereupon the stop 3 is lowered and the record card is fed to grippers (not shown) carried by a rotating cylinder or stacker drum 4 which stacks the cards side by side on a tray 5.

The sensing stations R1 and R2 are provided with conventional card detecting devices 6 and 7, respectively, which detect the presence of a record card at the respective stations. The sensing device 6, for example, comprises a cam controlled triple-armed lever. The triple-armed lever is spring urged, lifting the arm 6B thereof upwardly into engagement with a record card $r$ at the R1 station. If a card is detected, the cam follower arm $6a$ is held out of engagement with the low part of the cam 142, and the arm $6c$ is held out of engagement with the normally closed switch 145. However, if the arm 6B fails to detect a card, the lever is pivoted, causing the arm $6c$ to open the switch. At the appropriate time during the cycle of the machine, the high portion of the cam 142 engages the arm $6a$, pivoting the lever to lower the arm 6B out of the path of an advancing record card.

The card sensing device 7 is essentially identical to the card sensing device 6, and in the event of the failure of the device to detect the presence of a record card at the sensing station R2, the triple-armed lever thereof is pivoted in a direction to open the normally closed switch 146. The specific functions of the switches 145 and 146 will be described in connection with the circuit diagrams shown in Figures 13 and 14 of the drawings.

THE PUNCHING UNIT

In the coding or punching unit, record cards $x$ are discharged one at a time from the magazine M2 and fed to the P1, P2 and P3 stations in sequence. At the sensing station P1, the record card engages a raised stop 9 which positions the record card with respect to a group of sensing pins which, like the sensing pins of the sensing station R1, serve to detect the presence of an "X-punch" in any of the three decks of the record card so positioned. The presence of a record card at the sensing station P1 is detected by a card detecting device 8 which is essentially identical to the card detecting devices 6 and 7 previously described in connection with the reading stations R1 and R2 of the reading unit. The card detecting device 8 functions to open a normally closed switch 147 in the event that the device fails to detect the presence of a card at the P1 station. The record card is held at the reading station P1 for one cycle of the machine; then the stop 9 is lowered and the card is advanced to the punching station P2.

Figure 3:
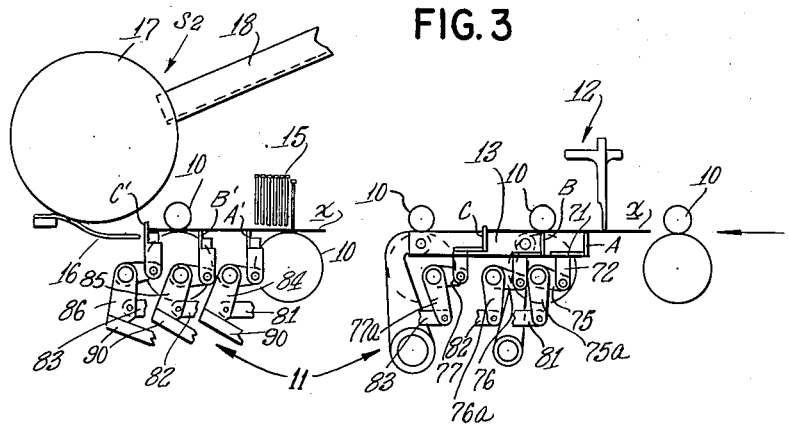
Figure 3 is a more detailed schematic representation of certain of the coding and sensing stations shown in Figure 1.

The stations P2 and P3 of the punching or coding unit are shown schematically but in somewhat more detail in Figure 3 of the drawings. Referring to Figure 3, record cards $x$ are fed one at a time by feed rollers 10 to a group of spaced apart card stops A, B and C selectively operated by a control mechanism, generally designated 11. The operable stop arrests the record card, thereby registering the card with respect to a punching mechanism, generally designated 12. As explained above, the particular stop selected determines the deck of the card which is presented to the punching mechanism.

The stops A, B and C are supported by a horizontally reciprocating frame 13, and the feed of the cards to the card registering stop is synchronized to occur at a time when the reciprocating frame is in one of its extreme positions, for example, the extreme position to the left, as viewed in Figure 3. While this card is arrested by the selected stop, the feed rollers make slipping contact with such card, thereby maintaining the leading edge of the card in registration with the selected card stop. Therefore, during the movement of the frame 13 to the right, against the direction of feed of the card by the feed rollers 10, and in the manner presently to be described, the card is maintained in registration with the operative stop by the feed rollers, so that the entire selected deck of the card passes beneath the punching mechanism 12 to permit the information to be impressed in the card.

If desired, the card can be fed from one stop to another so that successive decks of the record card are presented to the punching mechanism. Or, if preferred, the card can be released and advanced to a group of spaced apart stops A', B', and C' which are selectively operated by the same control mechanism 11 that operates the stops A, B and C. The raised stop arrests the card at the P3 station with respect to a bank of sensing pins 15 which read the information from the corresponding deck of the card. Finally, the card is released, guided by an inclined plate 16 to grippers (not shown) carried by a rotating cylinder or stacker drum 17, and stacked in a tray 18.

THE PUNCHING OR CODING MECHANISM

Figure 5:
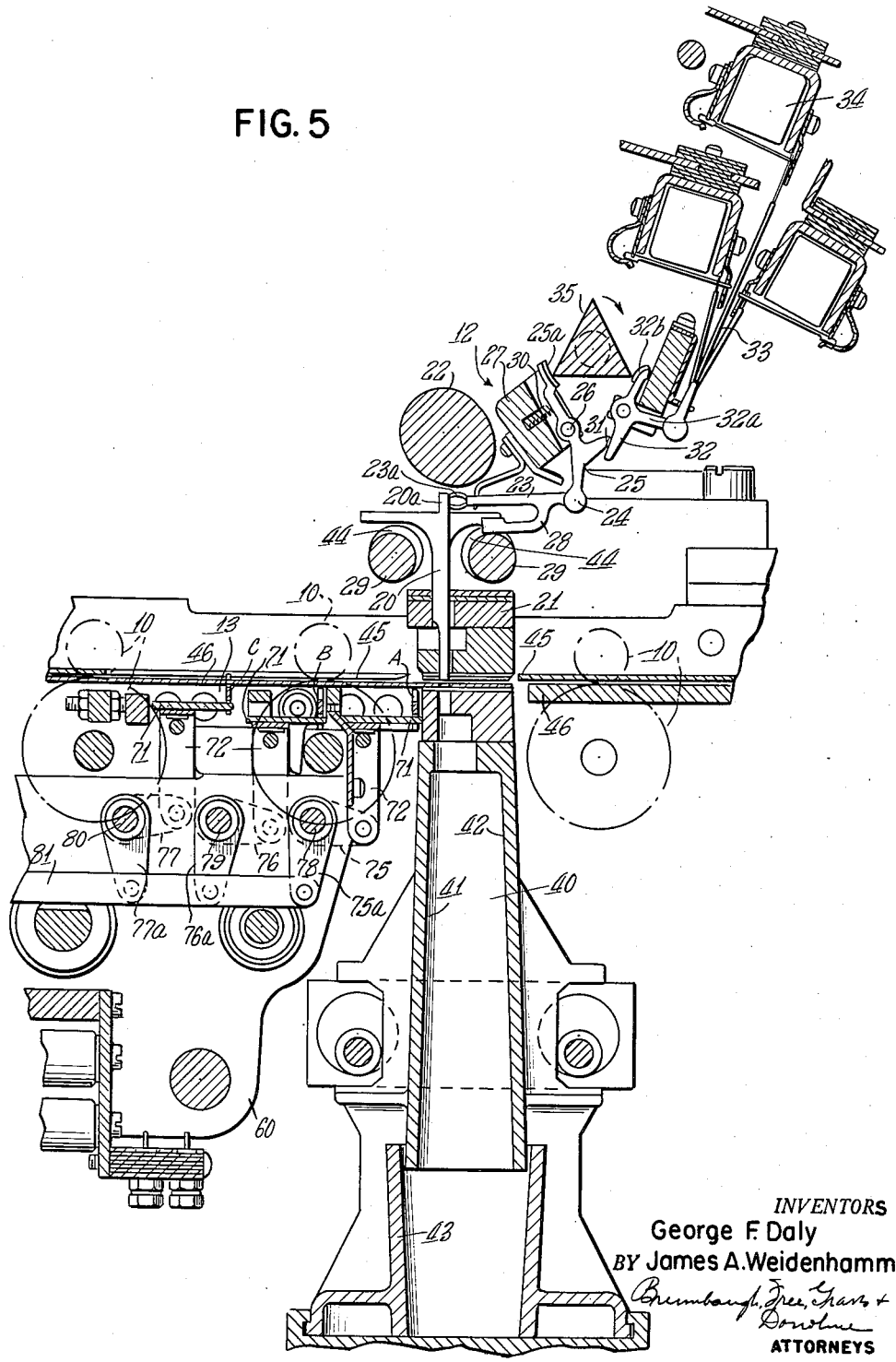
Figures 5 and 6 are elevational views, partly in cross-section, illustrating in much greater detail the part of the machine schematically represented in Figure 3.

The punching mechanism 12, although forming no part of the present invention, is shown in some detail in Figure 5 of the drawings. The punching mechanism illustrated is generally similar to that described in U.S. Patent No. 2,547,445 of G. F. Daly et al., and for a more complete understanding of the punching mechanism, reference may be had to that patent. For present purposes, it is sufficient to understand that the punching mechanism has a single row of vertically disposed card perforating members 20 which are movable in slotted guides 21. The punch members 20 are stationed side by side in a line beneath an elongated rotatable cam 22. The cam is supported for rotation at opposite ends in suitable frames (not shown) and continuously driven through a suitable drive transmission (not shown).

For each punch element 20 there is an interposer member 23 pivotally mounted at 24 to the lower end of a lever 25. The lever 25, in turn, is pivoted at 26 to a fixed block 27. The interposer member 23 is bifurcated to provide a lower finger 28 which rests upon a rotating cam 29. The cam 29 is so driven that it makes one revolution for each revolution of the cam 22. As the cam 29 rotates, the free end 23a of the interposer member 23 is oscillated in a vertical direction. The punch 20 is actuated by positioning the free end 23a of the interposer member between the head or upper end 20a of a punch element and the actuating cam 22.

The end 23a of the interposer member 23 is positioned between the head 20a of the corresponding punch and the actuating cam 22 by the pivotal actuation of the lever 25 under the influence of the spring 30. The actuating lever 25 is at all times urged by the spring 30 for movement about its pivot 26, but the lever is constrained against rotating by the engagement of an extension 31 thereof with a pivotal latch 32 which is spring urged to the position illustrated in Figure 5 of the drawings. An arm 32a of the latch 32 is connected by means of a rod 33 to the armature of a solenoid 34. There is, of course, a solenoid 34 and connections such as those described above for each of the punches, and the solenoids are mounted in such an array so as to permit close spacing of the punches 20.

Upon energization of the appropriate solenoid 34, the latch 32 is urged for movement in a counterclockwise direction as viewed in Figure 5, but rotation of the latch is prevented by the engagement of another arm 32b of the latch with one of the high points of a triangular timing cam 35. While the arm 32b of the latch is engaged by a high point of the timing cam 35, another high point of the timing cam engages an arm 25a of the lever 25. Thus, the actuation of the lever 25 is prevented by the timing cam 35, as well as by the latch 32. Upon energization of the solenoid 34 and the movement of one of the high points of the timing cam 35 out of contact with the arm 32b of the latch, the latch 32 is rocked counterclockwise to release position. As the timing cam 35 rotates, the latch 32 is freed for rotation before the lever 25. That is to say, the lever 25, although freed for rotation by release of the latch 32, is nevertheless still prevented from rotating due to the engagement of the high portion of the cam 35 therewith. However, upon actuating of the lever 25, interposer member 23 is thereby shifted horizontally to bring its free end 23a into vertical alignment with the head 20a of the punch at a time when the interposer member is held in its raised position by the cam 29 and at a time when the cam 22 has its low portion facing the interposer in order to provide an opening into which the free end 23a of the interposer may extend. The continued rotation of the cam 22 will bring the high portion thereof into engagement with the end 23a of the interposer, thereby imparting vertical motion to the punch 20 to actuate it in a downward direction. A record card, therefore, stationed beneath the punch will be perforated and the punched portion of the record card will fall through an open channel 40 defined between the walls 41 and 42 to a receptacle 43 beneath the lower discharge end of the channel 40. The depressed punch 20 will be restored to raised position after actuation by a pair of rotating cams 44 adjacent the cams 29.

CARD STOP MECHANISM AT P2 AND P3 STATIONS

Still referring to Figure 5 of the drawings, a record card x is fed by the feed rolls 10 between upper and lower guides 45, 46, respectively, until it encounters one of the card stops A, B and C which momentarily arrests the feed of the record card in position for punching one of the decks A, B or C of the record card. As will be explained more fully below, the card stops are so mounted that they can be selectively raised to operative position, the raised stop engaging and arresting the leading edge of a record card so as to register initially the card with respect to the punching mechanism.

As explained above with reference to Figure 3, the card stops A, B and C are reciprocated horizontally with the frame 13. The record card may be fed to the raised stop at one of the extreme positions of the reciprocating frame, the selected raised stop determining which of the decks of the record card is to be punched, and the reciprocating frame is then moved stepwise during one of its strokes in order to index successive rows of the selected decks in operative position beneath the punching members 20. Thereafter, the reciprocating frame is moved rapidly to card receiving position during its return stroke.

At the completion of the stepwise stroke of the reciprocating frame, the record card can be released by the selected stop and advanced to one of the stops of the P2 station to the left (as viewed in Figure 1) of the selected stop, or to one of the stops A', B' and C' of the P3 station. Or, if desired, a single deck of the record card can be punched repeatedly during successive cycles by simply leaving the same card stop elevated so that the card is returned to the initial punching position during the return stroke of the reciprocating supporting frame. During the forward or card advancing movement of the reciprocating frame, the record card is held in registered contact with the raised stop A, B or C by the feed rolls 10 which make slipping contact with the record card.

The card stops A, B and C are individually and selectively operated by a control apparatus supported between stationary side frames 60 (see Figure 7) which are connected by cross-members 61. The reciprocating frame 13 is supported for horizontal reciprocating movement by the stationary side frames 60.

Figure 10:
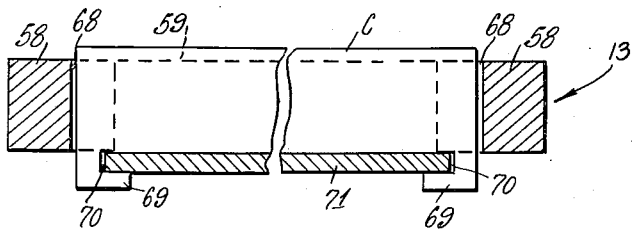
Figure 10 is a cross-section view taken along the line 10—10 of Figure 9, looking in the direction of the arrows.
Figure 9:
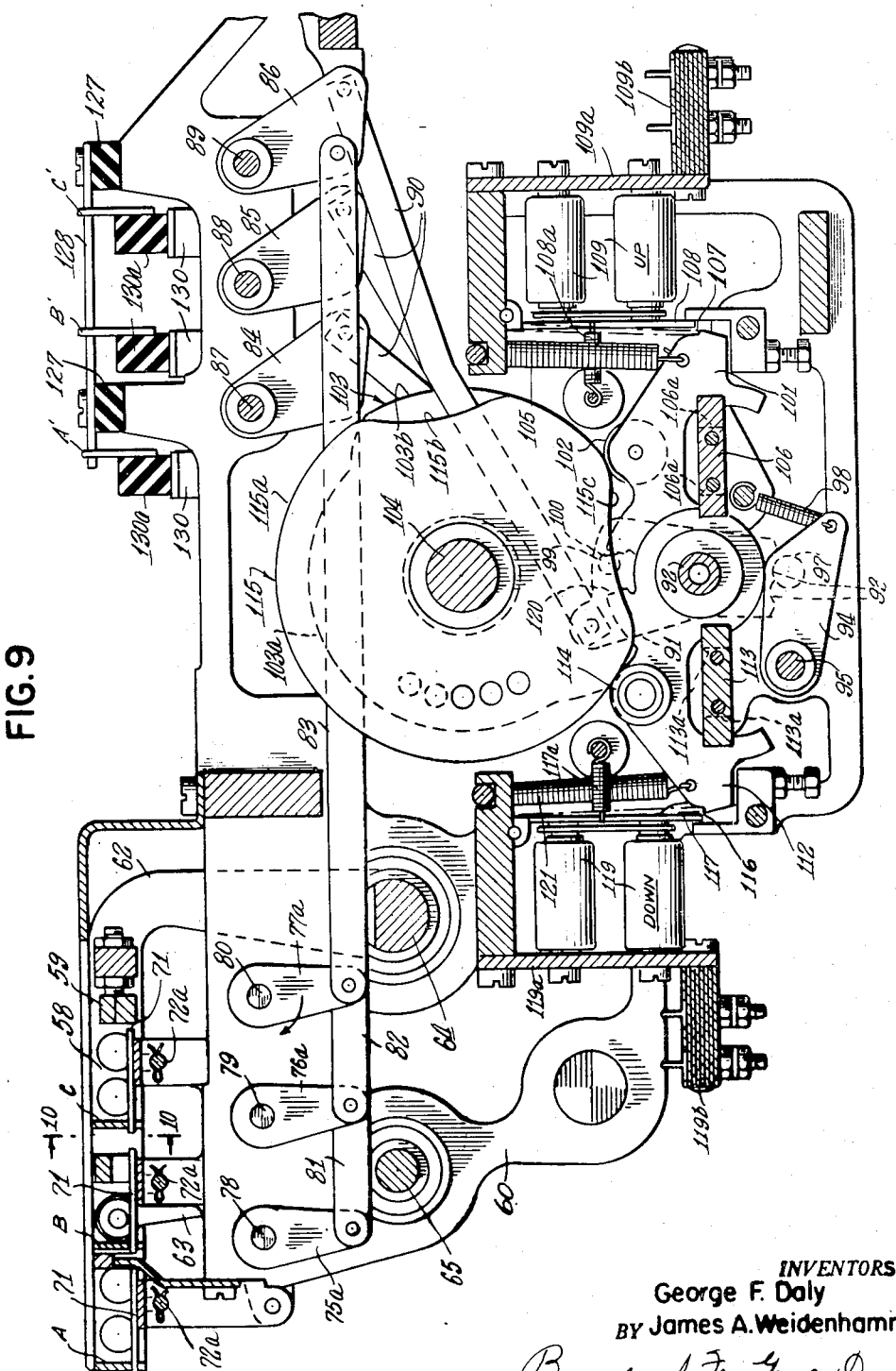
Figure 9 is a cross-section view taken substantially along the line 9—9 of Figure 7, looking in the direction of the arrows.

Referring now to Figures 9 and 10, the horizontally reciprocating frame 13 which supports the stops A, B and C is a rigid frame comprising a pair of side bars 58 connected by cross-bars 59. The reciprocating frame is supported by two pairs of pivotally reciprocating upstanding arms 62 and 63 affixed to rock shafts 64 and 65, respectively, which are rotatably mounted in the side frames 60. The arms 62 and 63 operate as a parallel linkage to support the frame horizontally while the frame is reciprocated thereby. The means for imparting reciprocation to the frame is best shown in Figure 8. As shown in that figure, one of the arms 62 has a downward extension which carries a cam follower roller 66. The cam follower roller 66 is adapted to rest against the outer surface of a stepped cam 67 which is mounted on the main drive shaft 104 of the apparatus. The extreme end of the shaft 104 carries a hub having a raised tongue 67a by means of which the shaft may be coupled to a suitable drive means. A record card x is fed into registration with the raised stop A, B or C while the roller 66 is in contact with a low portion of the cam 67 which represents the extreme rightward position of the stops A, B and C, as viewed in Figure 3, or the extreme leftward position thereof, as viewed in Figure 8. This enables the raised stop to momentarily arrest the card and to initially register it with respect to the punching mechanism 12. Thereafter, as the stepped cam rotates, the pivotal movement imparted to the arms 62 and 63 by the cam 67 will cause the entire frame 13 to move stepwise beneath the punching mechanism to give the punching elements 20 an opportunity to produce punches in each of the seven rows of the particular deck of the record card. Thereafter, the frame is rapidly returned to start position.

By reversing the direction of rotation of the cam 67 and by properly regulating the feed of the record cards, the cards may be initially arrested and registered while the reciprocating frame and the stops are in their extreme leftwardly position, as viewed in Figure 3, in which case the card would be moved step-wise relative to the punching mechanism 12 in a direction opposite to the direction of feed of the card.

Nothwithstanding the fact that the reciprocating frame 13 and the stops A, B and C carried thereby receive substantially horizontal reciprocation, the stops A, B and C are individually and selectively movable to raised or lowered position. Each of these stops is guided at both ends within vertical slots 68 (see Figure 10) formed in the inside edges of the side bars 58 of the reciprocating frame so that each of the stops can move up and down in response to the operation of the raising and lowering mechanism about to be described. Furthermore, each of the stops has a pair of downwardly depending, oppositely facing foot-like formations 69 formed integrally therewith. Slots 70 are formed directly above each of the downwardly depending foot-like formations 69, and these slots engage the opposite side edges of an actuating plate 71. There is an actuating plate 71 associated with each of the stops A, B and C, and each of these plates 71 is supported at the upper end of a stop lifter member 72 (see Figure 5). The slots 70 of the stops are capable of sliding engagement with respect to the side edges of the respective lifter plate 71 so that a given stop may be raised or lowered by the vertical movement of the corresponding lifter plate 71 during the horizontal reciprocation of the frame 13, notwithstanding the fact that the plates 71 do not reciprocate with the frame.

Figure 6:
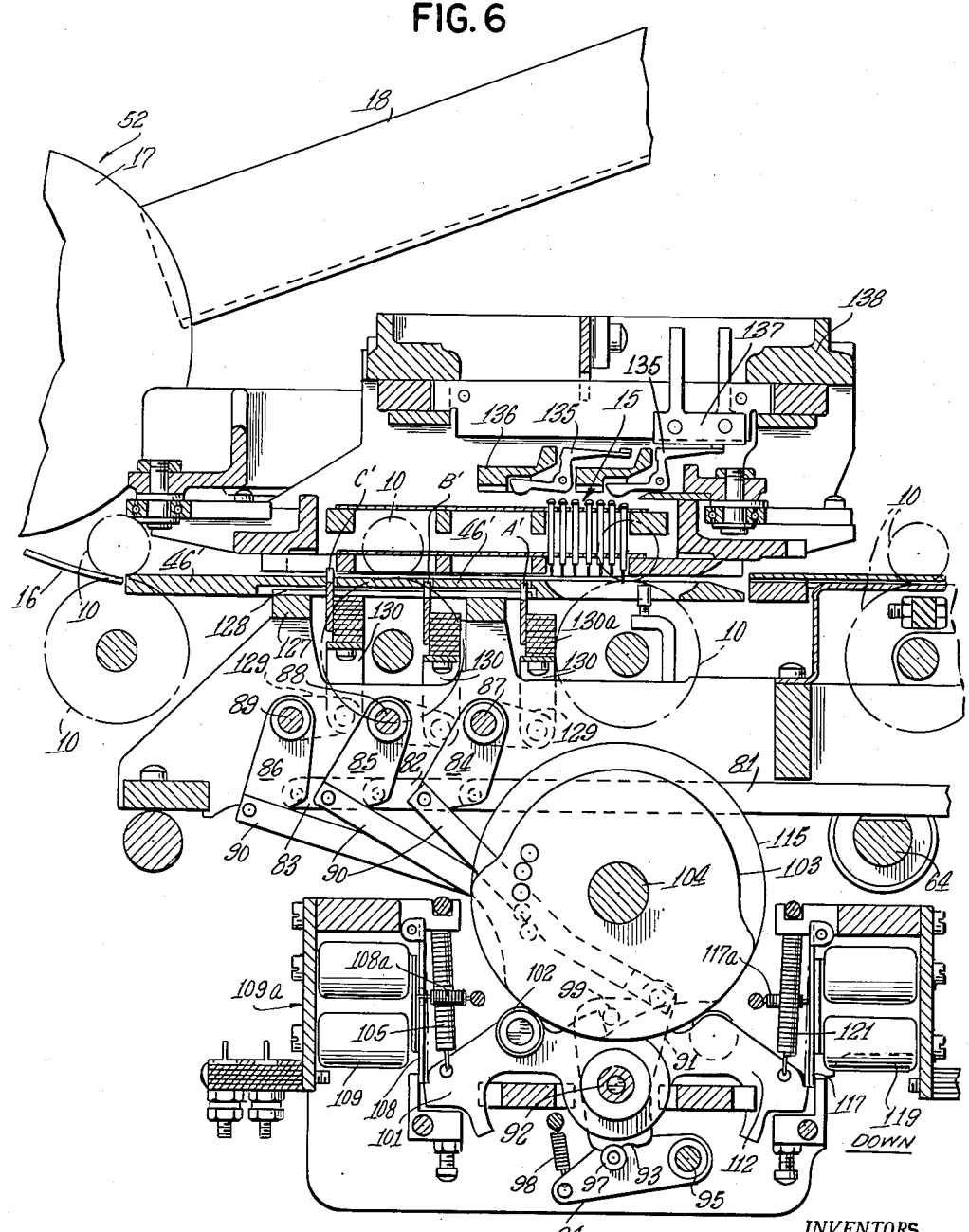

The control mechanism 11 for raising and lowering the stops A, B and C is best described with reference to Figures 5, 6 and 9 of the drawings. Referring to Figure 5, the stop lifting members 72 associated with the stops A, B and C are each operated by pivotal arms 75, 76 and 77 affixed to transverse rock shafts 78, 79 and 80, respectively. The shafts 78, 79 and 80 are rotatably supported at opposite ends by the side frames 60. The arms 75, 76 and 77 are each pivotally connected to the lower end of a corresponding lifter member 72 so that, as viewed in Figure 5, counterclockwise movement of the arms 75, 76 and 77 relative to shafts 78, 79, 80 will raise the stops A, B and C, respectively. In Figure 5, for example, the arm 77 is shown in operative position lifting the stop C into position to engage the leading edge of a record card advancing between the guides 45 and 46.

The lifter members 72, as best shown in Figure 8, each carry a transverse rod 72a, the extreme ends of which are accommodated in vertical guide slots 60b of the frame members 60a. The frame members 60a are mounted to the side frames 60 of the apparatus. The slots 60b guide the lifting members 72 during upward and downward movement.

As shown in Figure 9, the rock shafts 78, 79 and 80 carry downwardly disposed arms 75a, 76a and 77a, respectively, and the rock shafts are adapted to be operated by horizontally disposed transfer links 81, 82 and 83 which are pivotally connected to the arms 75a, 76a and 77a, respectively. As shown in Figure 6, the opposite ends of the transfer links 81, 82 and 83 are pivotally connected to pivotal arms 84, 85 and 86, respectively, which arms are keyed to and effect rotation of transverse rock shafts 87, 88 and 89, respectively. These rock shafts 87, 88, 89, like the rock shafts 78, 79 and 80, extend between the side frames 60 and are rotatably supported thereby. It is evident that the movement of the links 81, 82 and 83 will serve to raise or lower the stops A, B and C, the link 81 actuating the stop A, the link 82 actuating the stop B, and the link 83 actuating the stop C.

The links 81, 82 and 83 are individually actuated by a separate but similar operating mechanism, so that it will be necessary to describe in detail only one of the operating mechanisms. More specifically, as best shown in Figures 6 and 9, each of the arms 84, 85 and 86 is actuated by one of the actuating levers 91. The levers 91 are pivotally mounted on a common shaft 92. Links 90 connect the pivotal arms 84, 85 and 86 with the corresponding actuating lever 91. The lower portion of each of the actuating levers 91 extends beneath the shaft 92, and two adjacent detent recesses 93 are formed in each such portion. A detent roller 97, which is carried by an arm 94 pivotally mounted about a shaft 95, is adapted to engage one or the other of these recesses 93 to tend to maintain lever 91 in one or the other of two positions. The arm 94 is acted upon by a spring 98 which urges the roller 97 against the lower edge of the respective actuating lever 91.

Each of the levers 91 carries a pin 99 (see Figure 9) which projects laterally from one face thereof. Each pin 99 is normally in position to be engaged by a shoulder 100 of a corresponding cam actuated member 101 or by a shoulder 120 of a corresponding cam actuated member 112, there being three members 101 and three members 112 all of which are pivotally mounted on the shaft 92. A transverse bar 106 having slots 106a in its opposite edges serves to guide a corresponding member 101 during movement thereof; similarly, a transverse bar 113 having slots 113a in its opposite edges serves to guide a corresponding member 112. Each cam actuated member 101 carries a cam follower roller 102, and each member is connected to a spring 105 which acts thereon to urge the roller 102 into engagement with a corresponding rotatable cam 103 mounted on the shaft 104. Notwithstanding the action of the spring 105, each pivotal member 101 is normally latched in the position in which it is shown in Figure 9 by the engagement of a shoulder 107 thereof with the lower end of a corresponding pivotal armature 108 associated with one of three pairs of solenoids, generally designated 109.

Each member 101, when unlatched by the energization of the corresponding pair of solenoids 109 and actuated by the cam 103, imparts movement through the corresponding actuating lever 91 to raise one of the stops A, B or C. More specifically, upon energization of a selected pair of solenoids 109, the armature 108 is pivoted out of latching engagement with the shoulder 107 of the member 101, thus permitting the cam follower 102 to engage the surface of the cam 103. Thus, as the cam 103 rotates and the cam follower roller 102 comes into engagement with the low portion 103a of the cam, the member 101 is pivoted in a counterclockwise direction, as viewed in Figure 9, by the spring 105, and the shoulder 100 of the member 101, acting on the pin 99, rocks the corresponding actuating lever 91 in a counterclockwise direction, as viewed in Figure 9. This action is transmitted to the corresponding stop A, B or C through the associated link 90, the appropriate pivotal arm 84, 85 or 86, the appropriate link 81, 82 or 83, and the appropriate rock shaft 78, 79 or 80, thus raising the selected stop to operative position to engage the leading edge of a record card in registration therewith.

When the lever 91 moves from inoperative to operative position, one recess 93 is moved out of engagement with the roller 97 and the other is moved into engagement therewith. Thus, the particular lever 91 is held in actuated position even though the continued rotation of the cam 103 brings the high portion 103b thereof into engagement with the cam follower roller 102 to effect the resetting of the corresponding member 101. Upon de-energization of the solenoids 109, the spring 108a restores the armature 108 into position to reengage the shoulder 107 of the corresponding member 101, locking it in latched position until again released.

The actuating lever 91 is restored to its initial position, thereby lowering the selected stop A, B or C, by the pivotal cam actuated member 112. Each of the pivotal members 112, like the members 101, carries a roller-type cam follower 114 which is urged into engagement with the periphery of a cam 115 by a spring 121 connected to the member 112. The cams 115 are each mounted on the shaft 104 sandwiched between the cams 103 (see Figure 7). While one cam follower 114 engages the raised surface 115a of the corresponding cam 115, the corresponding member 112 will be in position to be locked out of operation by the engagement of the lower end of a corresponding pivotal armature 117 with a shoulder 116 of a corresponding member 112. Each armature 117 is normally urged into latching position by a corresponding spring 117a. Each armature, however, is adapted to be pivoted out of engagement with the corresponding shoulder 116 by the energization of a corresponding one of a pair of solenoids 119 associated with the armature. When the associated solenoids are energized and a low portion of a corresponding cam 115 is presented to the cam follower 114, corresponding member 112 is pivoted by a corresponding spring 121 in a clockwise direction, as viewed in Figure 9, bringing the shoulder 120 of such member 112 into engagement with the associated pin 99 and pivoting the corresponding lever 91 to its initial inoperative position. This action lowers the corresponding stop A, B or C out of the path of a record card fed between the guide plates 45 and 46.

The outer periphery of each cam 115 includes a raised portion 115a and two low portions 115b and 115c. This makes it possible to lower the selected stop A, B or C at either of two times during the cycle of rotation of the shaft 104, depending on whether the card is to be fed from one stop to another at the punching station P2 or released entirely and advanced to one of the card stops A', B' or C' of the sensing station P3. The two different times of release for the record card are provided to make it possible to coordinate the movement of the card with the time of elevation of the stops and to prevent overlapping of the cards.

When a particular actuating lever 91 has been restored to its initial inoperative position, thus lowering the operative stop A, B or C associated with it, the further rotation of the corresponding cam 115 will bring the high surface 115a into engagement with the cam follower 114, thus restoring the corresponding member 112 to its initial latched position. When the particular cam follower member 112 is restored and re-latched by the corresponding armature 117, the corresponding lever 91 is maintained in its normal inoperative position by the engagement of the detent roller 97 with the appropriate recess 93 of the lever.

Figure 7:
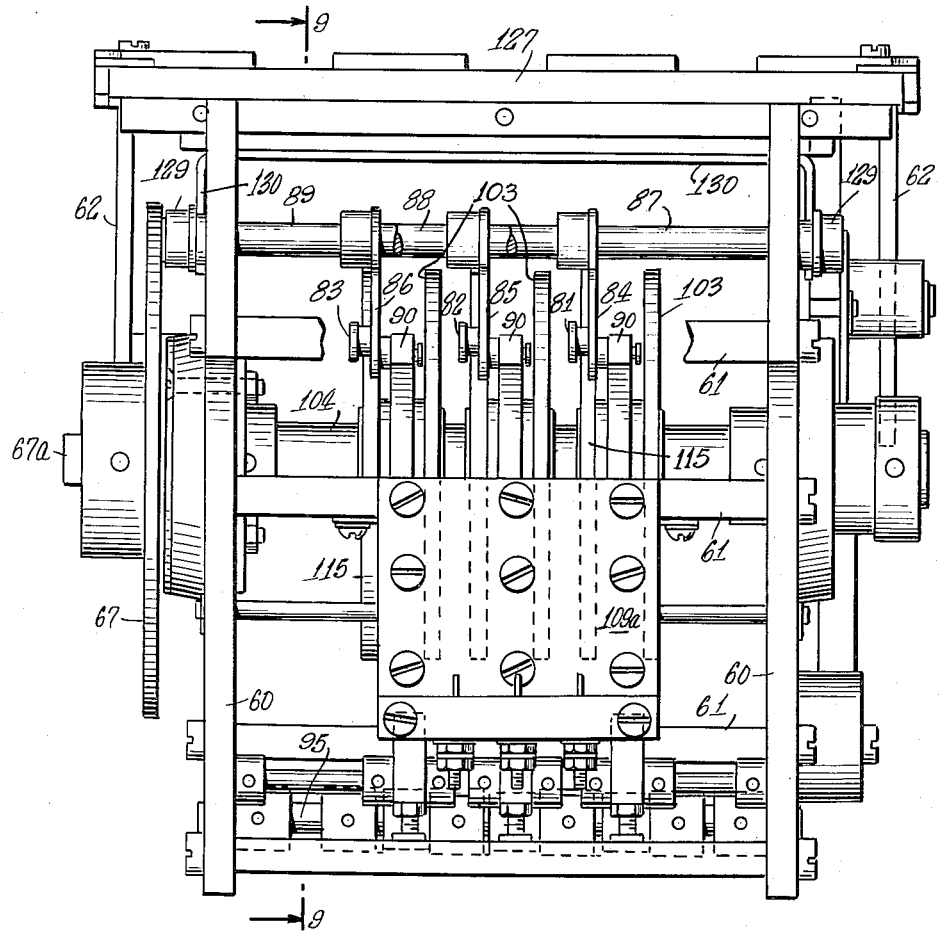
Figure 7 is an end view in elevation of certain of the control apparatus shown in Figures 5 and 6.

In a particular application of the present invention, it may be desirable (see Figures 1 and 3) to feed the cards to the information reading station P3 and to register one or more of the decks of the record cards x with respect to the sensing pins 15 by means of the registration stops A', B' and C'. In such cases, the deck of the record card which will be presented in registered position relative to the bank of sensing pins is determined by which of the stops A', B' or C' is raised to engage the leading edge of the card. Turning now to Figures 6, 7, 8 for a description of the appropriate part of the control mechanism 11 controlling operation of the stops, each of the rock shafts 87, 88 and 89 has affixed to it an arm 129 which is pivotally connected to the lower end of a corresponding lifter member 130, and the lifter members 130 carry the stops A', B' and C'. The stops A', B' and C' are each guided within slots formed in a horizontal plate 128, and the plate 128 is supported from the frames 60 by insulation blocks 127 (see Figure 8). In addition, each of the stops is mounted to its respective lifter member 130 by means of an insulation block 130a. The purpose of the insulation blocks 127 and 130a is to insulate the section 46' (see Figure 6) of the guide plate 46, which is electrically hot, from the main part of the machine.

Sensing mechanism of the type shown in the drawings is, of course, well known in the art, for example in U.S. Patent 2,528,411, granted to Beattie et al. and assigned to the assignee of the present invention. The pins 15 which encounter perforations in the record card drop to a lower position than the pins which do not encounter perforations in the record card, and the position of each of the pins is detected by a corresponding one of a plurality of pivotal contact arms 135 which are carried by a longitudinally reciprocating frame 136 which moves relative to the pins. As the frame 136 moves relative to the pins, any pin which is not aligned with a perforation in the record card holds the related contact arm 135 out of engagement with a stationary contact bar 137 mounted from a stationary frame 138. On the other hand, any pin which is aligned with a perforation allows the contact arm 135 to rock into contact with the contact bar 137; and it is in this fashion that the information read by the sensing pins 15 is translated into electrical pulses which are interpreted by well-known means.

As explained above in connection with the operation of the stops A, B and C, the stops A', B' and C' may be operated individually to register a selected deck of the record card with respect to the pins 15, and then passed on from one stop to another in order to read a different deck of the record card, or, if desired, only a single deck may be read and the record card advanced by the feed rolls 10 to the hopper 18 via the rotating cylinder 17.

THE DRIVE SYSTEM

The drive system for the machine is shown schematically in Figure 2. As shown in that figure, the reading unit and the coding or punching unit are both driven by a common drive motor 150 through transmission gearing, generally designated 151.

In general, the drive system for the reading unit is essentially the same as the drive system described in the above-mentioned Beattie et al. patent, No. 2,528,411. Only so much of that drive system as is pertinent to the present invention will be described herein. Referring to Figure 2, the mechanism 152 for raising and lowering the card registering stop 2, the card feeding mechanism 158 (which may be like the picker knife "245" described in the Beattie et al. patent) which discharges the record cards x from the magazine M1, and the common shaft which supports the circuit breaker cams R153, R154 and R155 are driven via the transmission gearing 151 through a solenoid operated clutch 156. This clutch is engaged during each machine cycle by the energization of a solenoid RS1 (a) to lower the stop 2, thereby permitting a record card r to advance from the sensing station R1 to the sensing station R2, (b) to discharge the next card from the magazine M1 which is then advanced to the sensing station R1, (c) to raise the stop 2 so as to engage the leading edge of the new record card, and (d) to rotate the circuit breaker cams R153, R154, R155 one complete revolution. At the completion of each machine cycle, the clutch 156 is disengaged.

The group of sensing pins at the sensing station R1 is raised and lowered during each cycle of the machine by means 159 driven through a solenoid operated clutch 160. The clutch 160 is normally disengaged, but it is adapted to be engaged by the energization of the solenoid 161. The sensing pins at the station R1 are elevated so as not to interfere with the feed of a record card to the raised stop 2 and are subsequently lowered to engage perforations in the record card.

The feed rolls 1 are continuously driven and they make slipping contact with the cards while they are stopped at the sensing stations R1 and R2.

During each machine cycle, vertical movement is imparted to the R2 sensing pins by means 162 which raises and lowers the entire bank of pins in timed relation to the feed of record cards r to the registering stop 3. For details of apparatus 159 and 162, reference can be made to the above-mentioned Beattie et al. patent.

The stacker drum 4 and the mechanism 164 for raising and lowering the stop 3 are driven through a solenoid operated clutch 165. The clutch 165 is engaged for operation during each cycle of the machine by the energization of the solenoid RS2 (a) to lower the stop 3 out of the path of the record card at the sensing station R2, permitting the record card to be advanced to the stacker drum 4, (b) to impart rotation to the stacker drum 4 to transfer the record card to the tray 5, and (c) to raise the card stop 3 into the path of the record advanced from the sensing station R1.

A group of circuit breaker cams, designated by the reference numerals C167 to C182, are mounted on a common shaft 183. The shaft 183 is driven directly through the transmission gearing 151 and makes one complete revolution during each machine cycle.

In the punching or coding unit of the machine, the mechanism 184 for raising and lowering the stop 9, the card feed means 195, and the common shaft which supports the circuit breaker cams P185, P186, P187 and P188 are driven through a solenoid operated clutch 189. The clutch 189 is engaged for operation during each cycle of the machine by the energization of a solenoid PS1. This clutch is engaged during each machine cycle (a) to lower the stop 9, thereby permitting a record card x to advance from the sensing station P1 to the punching station P2, (b) to discharge the next card from the magazine M2 and cause said next card to be advanced by the feed roll 10 to the punching station P1, (c) to raise the stop 9 to engage the leading edge of the card discharged from the magazine M2, and (d) to rotate the circuit breaker cams P185–P188 one complete revolution. At the completion of each machine cycle, the clutch 189 is disengaged.

The sensing pins at the sensing station P1 are raised and lowered in timed relation to the feed of record cards x thereto by suitable means 190 from the drive motor 150 through the transmission gearing 151. Also, the feed rolls 10, the punching mechanism 12 and the drive shaft 104, all described above, are driven from the main drive motor 150.

At the sensing station P3, the sensing pins are raised and lowered by means 191 which may be substantially identical to the means which imparts similar movement to the sensing pins at the sensing station R2.

The stacker drum 17 is periodically driven through a solenoid operated clutch 193. The engagement of the clutch 193 is controlled by the energization of a solenoid PS3 during each cycle of the machine, and the resulting engagement of the clutch drives the stacker drum 17 to transfer a card advanced thereto from the sensing station P3 and to stack the card on the tray 18.

CONTROL SYSTEM

(a) Examples of data reproduction

The versatility of the machine makes possible several different types of operations. The control circuits illustrated in Figures 13 and 14 for this machine will be described with relation to two specific examples, one of which is illustrated in Figure 11 and the other in Figure 12 of the drawings.

The example illustrated in Figure 11 is referred to herein as "no X-punch control" because these cards do not contain the particular code, referred to above, contained in the X row of a given deck which initiates the repetitive punching cycle of the machine. In the type of operation illustrated in Figure 11, the read card r is retained at the R2 sensing station for at least two successive machine cycles; and the punch card x is retained at the P2 punching station, although by different card stops, for at least two successive cycles of operation.

During the first cycle of operation, the punch card x is registered by the card stop A, and the field 1 in deck A of the read card r is reproduced in deck A of the punch card. The punch card is then advanced from the card stop A to the card stop B, and during the second cycle of operation the field 2 of deck A of the read card is reproduced in deck B of the punch card.

The other example which will be described is the so-called "X punch control," in which operation the punch card x is retained at a given card stop of the P2 punching station under the control of an X punch in another record card. An example of this operation is illustrated in Figure 12 of the drawings. In this example, read card 1 does not contain the X punch, and therefore the first two cycles of operation are identical to the operation described above in connection with Figure 11, that is to say, during the first cycle of operation the punch card is in registration with the card stop A and field 1 of deck A of read card No. 1 is reproduced in deck A of the punch card, and during the second cycle of operation the punch card is in registration with the card stop B and field 2 of deck A of read card No. 1 is reproduced in deck B of the punch card. Read card No. 2, however, contains the X punch which is detected while the read card No. 2 is at the R1 sensing station. Therefore, during the third cycle of operation, the read card No. 2 advances to the R2 sensing station but the punch card is retained by the card stop B of the P2 punching station, permitting field 3 of deck A of read card No. 2 to be reproduced in deck B of the punch card.

(b) Control system without X punch control

In this adaptation of the machine, the operations described above in Figure 11 are carried out sequentially as shown in Figure 15. The appropriate circuit is established by plugging in the conductors 200 and 201 (depicted by the —··— lines) and removing the conductors 202, 203 and 204 of Figure 13 and the conductors 205 and 206 of Figure 14 (all the conductors 202 to 206 being depicted by the —·— lines). The timing chart shown in Figure 15 shows the sequence of operation in this adaptation of the machine.

It will be assumed that record cards are located at all stations of the machine and that the read card r and punch card x described above in connection with Figure 11 are stationed at the R1 and P1 sensing stations, respectively. At 305° of the cycle preceding the cycle 1 identified in Figure 11, a circuit is established to lower the gates 2 and 9 to enable the cards to advance to their respective R2 and P2 stations. The circuit is established by the closing of the contacts associated with the control cam C170 (see Figure 13). The closing of these contacts completes a circuit from the +40 volt D.C. line through a switch 207 held closed by a starter relay (not shown), the conductor 208 and the normally closed contact 297–2 to the latch coils L of the punch feed relays 295 and 296 in parallel, and then to ground. The energization of these relays conditions for operation a circuit which functions to energize the solenoid PS1. This solenoid, as explained above in connection with Figure 2, controls the operation of the clutch 189 to lower the card stop 9. A similar circuit is established to energize a read feed relay 293 which conditions for operation a circuit which controls the lowering of the gate 2 of the R1 sensing station. This circuit is established from the +40 volt line through the contacts closed by the control cam C170, the closed switch 207, the conductor 209 and the normally closed contact 294–2 of a relay 294 to the latch coil L of the relay 293 and then to ground. The relays 293, 295 and 296 are all latching-type relays and will remain closed until restored by the energization of their unlatching or trip coils T.

The energization of the latch coil of the relay 293 closes the contact 293–3, completing a circuit which energizes relay 294. The energization of the relay 294, in turn, closes the contact 294–1, thereby completing a holding circuit for the relay 294, and opens the contact 294–2, thereby breaking the circuit to the latch coil of the relay 293. The breaking of this circuit, however, has no effect on the contacts controlled by the relay 293 because the relay remains latched until unlatched. Similarly, the energization of the latch coil of the relay 296 closes the contact 296–2, completing a circuit which energizes a relay 297. The energization of the relay 297, in turn, closes the contact 297–1, thereby completing a holding circuit for the relay 297, and opens the contact 297–2, thereby breaking the circuit to the latch coil of the relays 295 and 296. The breaking of this circuit has no effect on the contacts closed by the relays 295 and 296 because these relays remain latched.

At 340° of the cycle preceding the cycle 1 (as illustrated in Figure 11), a circuit is completed by the control cam C173 to energize the solenoids RS1 and PS1 which, as described above, engage the clutches 156 and 189, respectively. The circuit to energize the solenoid PS1 is completed from the + line (see Figure 14) through the contacts closed by the control cam C173, the conductor 210 and the contact 295–1 now closed to the solenoid PS1, then to ground. A similar circuit is established to energize the RS1 solenoid from the + line via the contacts closed by the control cam 173, the conductor 211, the conductor 212 (the contacts 262–4 and 265–4 both being closed), the closed contact 293–1 and the conductor 213 to the solenoid RS1 and then to ground.

As described above, the energization of the solenoid RS1 engages the clutch 156. One of the functions controlled by the drive transmitted through this clutch is the lowering of the card stop 2 which permits the record card at the R1 sensing station to advance to the R2 sensing station. Another of its functions is to discharge a record card r from the magazine M1 which is then advanced to the R1 sensing station. Similarly, the energization of the solenoid PS1 engages the clutch 189 which lowers the card stop 9, permitting the card at the P1 station to advance to the P2 station, and operates the card feed mechanism 195 to discharge a new record card x from the magazine M2 which card is then advanced to the P1 sensing station. Thus, the read card r shown in Figure 11 is now advanced to the card stop 3 of the R2 sensing station, and the punch card x is advanced to the selected card stop of the P2 punching station.

At 35° of the first cycle of operation, the control cam C170 again closes its contacts (this cam has two lobes, the first closing the contacts at 305° and the second closing the contacts at 35°). At this time, the contacts closed by the cam C170 complete a circuit from the + line via the conductor 214, the closed contact 295–4 to the latch coil of a relay 298 and then to ground. The relay 298 is a latch-type relay, and therefore will remain energized until its unlatching or trip coil is energized at 286° of this cycle by a circuit completed through the contacts associated with the control cam C172 via the conductor 215.

The relay 298 is referred to herein as the A deck selector relay because its energization completes a circuit to the appropriate solenoids 109 which operate to raise the card stop A at the P2 station. This circuit is completed at 45° by the control cam C175 (see Figure 14). The circuit is established from the +D.C. line via the conductor 216, the closed contact 298–1 and the conductor 217 to the solenoid 109 (stop A) and then to ground.

As described above, the energization of the solenoid 109 (stop A) raises the card stop A into the path of the punch card advancing toward the P2 station, registering the deck A of the card in operative position relative to the punching mechanism. The punch card is moved relative to the punching mechanism in the manner described above, and during this time, as shown in Figure 11, the field 1 of deck A of the read card is reproduced in deck A of the punch card.

Since the entire card including decks A, B and C, is sensed at one time at the R2 station, provision must be made to read systematically the selected decks and areas thereof. Accordingly, the same control circuit which energized the solenoid 109 (stop A) also energizes a deck control relay 309 (see Figure 14) which is of the pick and hold type. This circuit is established via the conductor 218 to the pick coil P of the relay and then to ground. The energization of the relay 309 moves the contact 309–1 into engagement with contact a so that a holding circuit will be completed at 85° of the machine's cycle by closing of the contacts associated with the control cam C182. The control cam C182 completes a circuit via the conductor 219, the closed contacts 309–1 and a and the conductor 220 to the hold coil of the relay 309 and then to ground. This hold circuit maintains the relay 309 energized until 344° of the cycle.

The energization of the relay 309 also closes the contact 309–2. This permits a circuit to be completed at 152° of the machine cycle through the closed contacts associated with the control cam C181 via the closed contacts 271–2 and 309–2 and conductor 221 to energize the deck A filter relays 310 to 314, inclusive.

The contact 271–2 is closed by the energization of the relay 271. If a card is detected at the R2 station by the card sensing device 7, the switch 146 will be closed. Therefore, when the contacts associated with the control cam C179 are closed for the first of several times, a circuit will be completed via the conductor 223 and the closed switch 146 to the pick coil of relay 271 and thence to ground. At 146° a holding circuit is completed by the closing of the contacts associated with the control cam C180 via the conductor 240, the closed contact 271–1 to the holding coil of the relay 271 and thence to ground.

The energization of the relay 310 closes the contact 310–1 and this, in turn, permits a circuit to be completed to enable the punch magnet PM1 (Figure 14) to initiate the punching operation at the P2 station. This circuit is completed at a plurality of spaced apart intervals (see Figure 15) by the periodic closing of the contacts controlled by the control cam C179. The circuit is established through the contacts closed by the control cam C179 via the conductors 223 and 224 and through the closed contact 310–1 to the magnet PM1 and then to ground.

When the punching operation has been completed, the punch feed and read feed relays 293, 295 and 296 are unlatched and their contacts restored to normal. But before describing these circuits, the functions of the card detectors 6 and 8 should be understood.

If the card detector 6 detects the presence of a card at the R1 station, a circuit is established at 44° of the first cycle to energize the relay 262. This circuit can be traced from the +40 volt D.C. line, through the closed contacts associated with the control cam R155 (see Figure 13), the switch 145 which, as described above, is closed if the card detecting device 6 detects the presence of the card at the R1 sensing station, and via the conductor 237 to the relay 262 and then to ground. At 55° of the cycle, a holding circuit is completed for the relay 262 by the closing of the contacts associated with the control cam R153 through the conductor 238, the closed contact 262-2 and the conductor 237 to the relay 262 and then to ground.

If a card is detected at the P1 station, the switch 147 will be closed. Therefore, when the contacts associated with the control cam P188 are closed at 44°, a circuit will be established to energize the relay 265 through the conductor 241. A holding circuit is completed for the relay 265 by the closing of the contacts associated with the control cam P186 at 55° of the cycle, thereby completing a circuit from the + line through the conductor 242, the closed contact 265-2 to the relay 265 and then to ground.

The unlatching of the relays 293, 295 and 296 can now be described. At 290° of cycle 1, the contacts controlled by the control cam R154 are closed, completing a circuit from the + line via the conductor 225, the contact 262-1 (now closed) and the conductor 226 to the unlatching coil of the relay 293. Also, a circuit is established by the closing of the contacts associated with the control cam P187 via the conductor 227, the closed contact 265-1 to the unlatching coils of the relays 295 and 296 in parallel, and then to ground.

At 285° of cycle 1, the latch coil of a relay 289 (see Figure 13) is energized. This circuit is established by the closing of the contacts associated with the control cam P185. The energization of the relay 289 closes the contacts 289-1 and 289-2, and these contacts remain closed until the read and punch operation is completed.

At 295° a relay 339 (see Figure 13), referred to as the cycle 1 relay, is energized under the control of the timing cam C167 by a circuit established through the closed contact 289-2, the contact 290-2 which is in position in engagement with the contact a, and the normally closed contact 291-1 to the relay 339 and then to ground. The energization of the cycle 1 relay 339, in turn, closes the contact 339-1, so that at 305° of cycle 1 a circuit is completed through the closed contacts of the control cam C170, the conductor 228 to the latch coil of the relay 301 and then to ground. The relay 301 remains latched until 286° of cycle 2, when it is opened by the energization of the unlatching or trip coil T. The circuit which energizes the trip coil is established by the contacts closed by the control cam C172, in the same manner as described above in connection with the energization of the trip coil of the relay 298.

During cycle 2, there is to be no advance of the cards at the stations, except for the advance of the card at the P2 station from stop A to stop B. Therefore, the card feed relay 293 associated with the reading unit and the card feed relays 295 and 296 associated with the punching unit are not energized, notwithstanding the fact that the contacts associated with the control cam C170 are closed, due to the fact that the starter switch 207 is open. The failure of the relays 293, 295 and 296 to become latched prevents the clutch controlling solenoids RS1, RS2, PS1 and PS3 from becoming energized.

At 40° of cycle 2 the solenoid 109 (stop B) is energized to raise the card stop B at the P2 station, thereby positioning the card stop B in the path of the punch card for the punching of field 2 therein. This circuit is established by the control cam C175 when its contacts are closed via the conductor 216, the closed contact 301-1 and the conductor 230 to the solenoid 109 (stop B) and then to ground. At the same time, a circuit is also established to the pick coil of the relay 409 via the conductor 231.

Although the solenoid 109 (stop B) associated with stop B is energized, thereby raising the card stop B at the P2 station, the card stop A is still raised and must be lowered before the punch card can be advanced to the card stop B. Accordingly, at 55° of cycle 2, the control cam C174 closes its contacts, completing a circuit through the conductor 232, the closed contact 301-2, the normally closed contact 295-2 and the conductor 233 of the solenoid 119 (stop A) associated with deck A and then to ground. Upon the lowering of the card stop A, the punch card is advanced by the rollers 10 to the raised card stop B.

During cycle 2, the deck B filter relays 410 to 414 are energized in a fashion similar to the energization of the deck A filter relays 310 to 314, inclusive. The deck A control relay 309, of course, was deenergized at 344° of the first cycle by the opening of the contacts associated with the control cam C182. Also, the pick coil of the deck B control relay 409, as described above, is energized simultaneously with the energization of the solenoid 109 (stop B). At 85° of cycle 2, while the pick coil is still energized, a holding circuit is established for the relay 409 by a circuit completed by the closing of the contacts associated with the control cam C182, the contact 309-1 in engagement with contact b, the closed contact 409-1 and the conductor 234 to the holding coil H of the relay 409 and then to ground. The deck B filter relays 410 to 414, inclusive, are energized by the closing of the contacts associated with the control cam C181 and by a circuit completed through the closed contacts 271-2 and 409-2 and the conductor 235.

During cycle 2 the punching magnet PM1 is again energized, this time by a circuit completed by the closing of the contact 410-1. This circuit is established by the first closing of the contacts associated with the control cam C179, the conductor 223, the closed contact 410-1 to the magnet PM1 and then to ground. In this way the field 2 of deck A of the read card is reproduced in deck B of the punch card.

The punching operation now being completed, the punch card and read card are now ready to be advanced out of the P2 and R2 stations, respectively. Accordingly, at 270° of cycle 2, the contacts associated with the control relay C169 (see Figure 13) are closed, completing a circuit through the closed contact 289-1 to the latch coil of the relay 290 and then to ground. The relay 290 is a latch-type relay which remains energized until the unlatching coil T thereof is energized in a manner to be described. Therefore, at 295° of the second cycle, cycle 2 output relay 340 is energized by a circuit completed by the closing of the contacts associated with the control cam C167. The closing of these contacts establishes a circuit from the +40 volt D.C. line through the closed contact 289-2, the contact 290-2 in position b, the contact 291-2 in position a to the relay 340 and then to ground. The energization of the relay 340 conditions the circuits to again energize the relays 293, 295 and 296. These circuits are established at 305° of the cycle by the closing of the contacts associated with the control cam C170. One of these circuits can be traced through the closed contact 340-1, the conductor 201, the closed contact 344-3, the conductors 236 and 208, the normally closed contact 297-2 to the latching coils of the relays 295 and 296 in parallel and then to ground. The other is traced through the closed contact 340-3, the conductor 200, the contact 344-4 and the conductor 209 and normally closed contact 294-2 to the latching coil of the relay 293 and then to ground.

At 340° of cycle 2, the clutch control solenoids PS1 and PS3 are energized by the closing of the contacts associated with the control cam 173. This establishes a circuit from the + line through the conductor 210, the closed contact 295–1 to the solenoid PS1 and then to ground, and also from the closed contact 295–1 through the closed contact 265–3 and the conductor 243 to the solenoid PS3 and then to ground. Also, a circuit is established by the closed contacts of the cam C173 through the conductor 211, the conductor 212 (the contacts 265–4 and 262–4 being closed), the closed contact 293–1 and the conductor 213 to the solenoids RS1 and RS2 in parallel and then to ground. As explained above, the solenoid PS1 engages its respective clutch and lowers the gate 9 at the P1 station to advance the card to the P2 station. The solenoid PS3 operates the stacker mechnism S2. Also, the RS1 and RS2 solenoids engage their respective clutches to lower the stops 2 and 3 at the R1 and R2 stations.

A circuit is established to energize the solenoid 119 (stop B) in order to lower the card stop B and permit the advance of a card from the P2 to the P3 station. This circuit is established by the closing of the contacts associated with the control cam C173 through the conductor 210, the closed contact 295–1, the closed contact 265–3, the conductor 244, the closed contact 295–3 and the conductor 245 to the solenoid 119 (stop B) and then to ground. The energization of this solenoid permits the card of the P2 station to be advanced to the P3 station.

New cards are now at all stations, and the entire operation is repeated.

(c) *X punch control system*

In this adaptation of the machine, the conductors 200 and 201 (those depicted as —..— lines) are removed, and the conductors 202, 203, 204, 205 and 206 (those depicted as the —.— lines) are plugged in.

Referring to the example illustrated in Figure 12 of the drawings, the read card 1 is not X punched and, therefore, the first cycle and the first part of the second cycle of operation of the machine are generally the same as those described above in the circuit without X punch control. Accordingly, in the time chart for the X punch control circuit (see Figure 16), the sequence of the operations is substantially the same as in the timing chart for the circuit without X punch control (see Figure 15).

One difference in the cycle 2 operation is that the card stop B at the P2 station must remain in its raised position to make possible the repeat punching operation during the third cycle of operation, at which time field 3 of the read card No. 2 is reproduced in deck B of the punch card. Another difference is that during cycle 2 the read card No. 2 is sensed at the R1 sensing station to detect the X punch therein. This detection of the X punch energizes the relay X (see Figure 14) closing the contacts 250x and 251x, thereby initiating the programming controls which retain the punch card No. 1 at the P2 station for one additional cycle of operation.

The sensing of the X punch in the read card No. 2 at the R1 sensing station will now be described. Referring to the timing chart illustrated in Figure 16, at 60° during cycle 2, the solenoid 161 is energized, for operatively via clutch 160 lowering the R1 sensing pins. The energization of the solenoid 161 is accomplished by a circuit completed through the closed contacts associated with the control cam C176 (see Figure 14), the conductor 245, the closed contact 262–3 to the solenoid 161 and then to ground.

At 135° of cycle 2, the contacts associated with the cam C178 are closed to energize the filter relay 354. The energization of this relay closes the contact 354–1. Thereupon, at 141° of cycle 2, a circuit is established by the closing the contacts associated with the control cam C179 to energize the latch coil L of the selector relay 344. This circuit is completed through the closed contacts associated with the control cam C179, the conductors 223 and 206, the closed contact 354–1 and the conductor 250 (the contact 250x being closed) to the latch coil of relay 344 (see Figure 13) and then to ground. The contacts controlled by the latching of the relay 344 unconditions during cycle 2 the circuits which control the advance of the record cards from one station to another of the punching unit, and instead postpones the conditioning of these circuits until cycle 3. However, the circuits controlled by the latching of the relay 344 permit the record cards of the reading unit to advance from station to station in the usual manner.

Accordingly, at 305°, of cycle 2, a circuit is established by the closing of the contacts associated with the control cam C170 to energize the latch coil of the relay 293. This circuit is established through the closed contacts associated with the control cam C170 through the closed contact 340–2, the conductor 202, the contact 344–4 and the conductor 209 to the latch coil of the relay 293 and then to ground. It should be noted that at this time the punch feed relays 295 and 296 cannot be energized because the contact 344–3 is opened by the energization of the relay 344. Also, a circuit cannot be established through the starter switch 207 because it is open at this time.

From the foregoing description, it is evident that the punch card is retained at the P2 station for an additional cycle of operation, so that during cycle 3 the information contained in the field 3 of read card No. 2 will be sensed and punched into field 3 of deck B of the punch card.

At 255° of cycle 3, a circuit is completed to energize the latch coil L of the relay 291. This circuit is completed by the closing of the contacts associated with the control cam C168 through the closed contact 290–1 to the latch coil of the relay 291 and then to ground. The latching of the relay 291 opens the contact 291–1 which is in series with the cycle 1 relay 339 and shifts the contact 291–2 from the *a* position to the *b* position, thereby breaking the connection to the cycle 2 relay 340, at the same time completing a circuit to energize the cycle 3 relay 341. This circuit is completed through the closed contacts associated with the cam C167, the closed contact 289–2, the contact 290–2 in the *b* position and the contact 291–2 in the *b* position to the relay 341 and then to ground. The energization of the relay 341 closes the contacts 341–1 and 341–2.

At 305° of cycle 3, a circuit is completed by the closing of the contacts associated with the cam C170 to energize the read feed relay 293 and the punch feed relays 295 and 296. The relay 293 is energized through the closed contact 341–1, the conductor 204, the closed contact 344–1, the conductor 209 and the closed contact 294–2 to the latch coil relay 293 and then to ground. The circuit to the relays 295 and 296 is completed through the closed contact 341–2, the conductor 203, the closed contact 344–2, the conductors 236 and 208 and the contact 297–2 to the latch coils of the relays 295 and 296 in parallel and then to ground.

In preparation for the advance of cards at all stations, at 326° of cycle 3 the relay 336 is energized by the closing of the contacts associated with the cam C177. Then, at 340° of cycle 3, the X selector relay 344 is restored to its normal position by the energization of the trip coil T thereof. This circuit is completed by the closing of the contacts associated with the cam C173 through the conductor 210, the closed contact 295–1, the conductor 205, the closed contact 336–1 and the conductor 251 to the trip coil of the relay 344.

Also at 340° of cycle 3, circuits are completed to energize the solenoids RS1, RS2, PS1 and PS3 by the closing of contacts associated with the control cam C173. The solenoid PS1 is energized by a circuit through the closed contacts of the control cam C173, the conductor 210, the closed contact 295–1 to the solenoid PS1 and then to ground. The solenoid PS3 is energized by a circuit through the closed contacts of the control cam C173, the conductor 210, the closed contact 295–1, the closed contact 265–3 and the conductor 243 to the PS3 solenoid and then to ground. As explained above, the energization of the PS1 solenoid lowers the card stop at the P1 station, permitting the card at the P1 station to advance to the P2 station, and the energization of the PS3 solenoid controls the operation of the stacking mechanism S2.

Circuits are also established at 340° of cycle 3 by the closing of the contacts associated with the control cam C173 to energize the RS1 and RS2 solenoids. These circuits are established through the closed contacts associated with the cam C173, the conductor 211, the conductor 212 (the contacts 265–4 and 262–4 being closed), the closed contact 293–1 and the conductor 213 to the RS1 and RS2 solenoids in parallel and then to ground. As explained above, the energization of the RS1 solenoid releases the control card at the R1 station and permits it to advance to the R2 station; in addition, the energization of the RS2 solenoid releases the card at the R2 station and initiates the operation of the stacking mechanism S1.

A circuit is also completed at 340° to lower the card stops B and B' at the P2 and P3 stations, respectively. This operation is controlled by the energization of the solenoid 119 (stop B). The circuit is established by the closing of the contacts associated with the cam C173 via the conductor 210, the contacts 295–1 and 265–3, the conductor 244, the closed contact 295–3 and the conductor to the solenoid 119 (stop B) to ground.

It remains now only to unlatch the relays 289, 290 and 291. Accordingly, at 115° of the cycle following cycle 3 in which both read and punch clutches are activated, these relays will be restored to unlatched position by the closing of the contacts associated with the control cam C171. This circuit is established through the closed contacts associated with the cam C171, the conductor 252, the closed contacts 296–1 and 293–2, and the conductor 253 to the trip coils T of the relays 289, 290 and 291 in parallel and then to ground.

In Figures 13 and 14 of the drawings, only the circuitry associated with the operation of the card stops A and B is shown. The pattern of the circuit, however, is the same for the control of the card stop C.

TYPICAL OPERATION

Figure 17 of the drawings shows the progress of a series of record cards through the punching unit during six consecutive cycles. The progress of particular record cards designated 0, 1, 2, 3, 4, 5 and 6, from the magazine M2 to the stations P1, P2, P3 in sequence, and finally to the stacker, is indicated thereon.

At the beginning of cycle 1, the record card 0 is shown at the P3 station, while cards 1 and 2 are located at the P2 and P1 stations, respectively. The card 3 has yet to be discharged from the magazine M2. By tracing the path of the record card 2, it is noted that during cycles 1 to 3, inclusive, the record card 2 is punched twice in deck A and once in deck C. It can be assumed that this sequence was determined by an X punch sensed either in the card 2 while it is at the P1 sensing station, or by an X punch in a corresponding card sensed at the R1 sensing station of the reading unit.

During cycle 1, the stops C and C' of the stations P2 and P3, respectively, are lowered, permitting the card 0 to advance to the stacker and the card 1 to advance to the card stop A' of station P3 which is raised in the time interval between the passing of the trailing edge of the card 0 and the arrival of the leading edge of the card 1 into registration therewith. Concurrently, the card stop 9 of the P1 station is lowered, permitting the record card 2 to advance until it engages the card stop A of the P2 station, which is raised at the same time and by the same means as the stop A' of the P3 station.

During the latter half of cycle 1, the record card 2 is punched in deck A under the control of either the record card at the P3 station, in the case of gang punching, or under the control of a corresponding record card at the R2 station of the reading unit, in the case of reproducing, or under the influence of the record cards at both the R2 and P3 stations. Inasmuch as the record card 2 is to be punched twice in deck A, there is no advance in the record cards 1, 2 or 3 at the beginning of cycle 2. The second punching of deck A of the record card 2 takes place during the latter half of cycle 2.

Since deck C of record card 2 is to be punched during cycle 3, the record card is not released immediately by the card stop A (as it would be if it were to be advanced to the P3 station) but is again pushed to the right by the return stroke of the carriage which reciprocates the card stops. Thereafter, the card stop A is lowered, permitting the record card 2 to advance under the influence of the rollers until it strikes the card stop C of the P2 station which is raised in time to intercept the card. The release of the record card 2 at the P2 station is delayed to a time considerably later than the release of card 1 during the first cycle because it is to be transferred only to a different stop of the P2 station rather than advanced to the P3 station. Concurrently with the movement of the record card 2 from stop A to stop C of the P2 station, the record card 1 at the P3 station progresses from the stop A' to the stop C' since these stops operate in unison with the corresponding stops of the P2 station. During the latter part of cycle 3, the record card 2 is punched in deck C.

At the beginning of cycle 4, the program circuits indicate that the succeeding card is to be advanced to the P2 station, whereupon the stop C is lowered at its earlier point of time, allowing the record card 2 to proceed to stop A' of the P3 station. Simultaneously the stop C' at the P3 station is lowered to allow the record card 1 to advance to the stacker. At the same time, the card stop 9 of the P1 station is lowered, permitting the record card 3 to advance to the stop A of the P2 station, and the record card 4 is advanced from the magazine to the P1 station.

During the latter half of cycle 4, deck A of the record card 3 is punched, and during the first half of cycle 5, since punching is also to take place in deck B, the card stops A and A' at stations P2 and P3 are lowered, and the stops B and B' are raised, causing the record cards 2 and 3 to advance to the stops B and B' of the stations P2 and P3, respectively.

Following the punching of deck B of the record card 3 during cycle 5, stop B' is lowered at its earlier time, permitting the record card 2 to advance to the stacker and the record card 3 to advance to the station P3. At the same time the stop 9 at the P1 station drops, permitting the record card 4 to advance to the P2 station and the record card 5 to advance from the magazine to the station P1. Thus, during this sequence of operations, the record card 3 is punched in its A and B decks.

The foregoing sequence of operations described in connection with Figure 17 is merely illustrative of a typical card movement in the punching unit.

The invention has been shown in preferred form and by way of example only, and obviously many variations and modifications may be made therein without departing from the spirit of the invention. The invention, therefore, is not to be limited to any specified form or embodiment, except in so far as such limitations are set forth in the claims.

We claim:
1. An apparatus for handling record cards which are divided into a plurality of information receiving areas comprising a card coding station, coding mechanism at the coding station for impressing information in a record card, a card sensing station, means for feeding cards to said stations in sequence, a series of card stops at said coding station, one stop for each information receiving area, means for selectively actuating said card stops to move a selected card stop into the path of a record card, means for imparting reciprocatory motion to said selected card stop to move the record card and the information receiving area thereof relatively to the coding station, and means for moving the selected card stop out of the path of the record card.

2. An apparatus for handling record cards which are divided into a plurality of information receiving areas comprising means for feeding the record cards in a given path of travel, a plurality of stop means movable into the path of travel to engage the leading edge of a record card, control means for selectively operating said plurality of stop means, the selected stop initially registering the record card to present a predetermined area of the record card in an operative position, means for moving the selected stop means translationally to move the record card and the information receiving area of the record card relative to the operative position, and means to move the selected stop means out of the path of travel of the record card to thereby release the record card.

3. An apparatus as set forth in claim 2 including a sensing station, means for feeding a record card to said sensing station, and means operative in response to a particular code in the record card sensed at said sensing station to prevent the movement of the selected stop means out of the path of travel of the record card.

4. An apparatus for handling record cards which are divided into a plurality of information receiving areas comprising means for recording information on the record cards, means for feeding record cards to the recording means, a plurality of stop means individually movable into the path of travel of the record cards to arrest a record card in predetermined position relative to the recording means for recording information in one of the information receiving areas, control means for selectively operating said plurality of stop means, and means for imparting stepwise movement to the selected stop to index the record card relative to the recording means.

5. Card registering apparatus comprising card feeding means, a stop movable into position to engage the leading edge of the card and thereby arrest its forward movement, an actuator shiftable into alternate positions, the movement of the actuator into one of said positions rendering the stop operative and the movement of the actuator into the other of said positions rendering the stop inoperative, a first member operable to shift the actuator to said one of said alternate positions, a second member operable to shift the actuator to said other of said positions, and means for independently operating said first and second members.

6. Card registering means as set forth in claim 5 including means for imparting reciprocating movement to said stop in a direction substantially longitudinal to the direction of feed of the card.

7. Card registering means as set forth in claim 5 including one means for imparting reciprocating movement to said stop in a direction substantially longitudinal to the direction of feed of the card, other means interposed between said actuator and said stop for moving the stop in a direction substantially at right angles to the direction of feed of the card to render the stop operative, said other means including means relative to which the stop is movable during its reciprocating movement, whereby the stop may be rendered operative independently of said one means and irrespective of its reciprocated position.

8. Card registering apparatus comprising card feeding means, a stop movable into position to engage the leading edge of the card and thereby arrest its forward movement, an actuator shiftable into alternate positions, the movement of the actuator into one of said positions rendering the stop operative and the movement of the actuator into the other of said positions rendering the stop inoperative, a first movable member for shifting the actuator to one of said alternate positions, a second movable member for shifting the actuator to the other of said alternate positions, latch means for said first movable member, latch means for said second movable member, and means for releasing each of said latch means.

9. Card registering apparatus comprising card feeding means, a stop movable into position to engage the leading edge of the card and thereby arrest its forward movement, an actuator shiftable into alternate positions, the movement of the actuator into one of said positions rendering the stop operative and the movement of the actuator into the other of said positions rendering the stop inoperative, a cam shaft, cam means thereon, a first cam follower member for shifting the actuator to one of said alternate positions, a second cam follower member for shifting the actuator to the other of said alternate positions, means for urging said first cam follower member into engagement with said cam means, means for urging said second cam follower member into engagement with said cam means, latch means for locking said first cam follower member out of operation, latch means for locking said second cam follower member out of operation, and means for independently releasing each of said latch means.

10. An apparatus for handling multiple-deck record cards comprising means for feeding the record cards in a given path of travel, a stationary frame, a frame movable in relation to said stationary frame, drive means for imparting reciprocating motion to said movable frame, a group of stops slidably mounted in said reciprocating frame, whereby said stops are individually and selectively movable into the path of travel of said record cards to engage the leading edge thereof, the selected stop of said group registering the record card and one of the decks thereof initially in a predetermined position and the reciprocation motion of said stop thereafter shifting the record card relative to said predetermined position, a stop actuating member associated with each stop, means carried by said stationary frame for guiding each of said stop actuating members, means supported by said stationary frame for selectively operating said stop actuating members, and sliding connections between each of said stop actuating members and the corresponding stops to maintain a stop actuating member and the corresponding stop coupled while the stops are reciprocated with said frame.

11. An apparatus as set forth in claim 10 wherein said drive means for imparting reciprocating motion to the stop supporting frame includes a rotatable stepped cam for imparting stepwise movement to the reciprocation frame during at least one stroke thereof.

12. An apparatus for coding record cards having a plurality of predetermined information receiving areas comprising a first card sensing station, a second card sensing station, means for sensing code information from a record card at said first and second sensing stations, a coding station, coding mechanism for applying code information to a record card at said coding station, card stops at said first and second sensing stations for registering cards relative to the sensing means at each station, a plurality of spaced apart card stops at said coding station, each for registering a different information area of the record card relative to the coding mechanism, actuating means for moving a selected stop at said coding station into the path of travel of a record card to thereby register the corresponding information area of the record card with the coding mechanism, means for operating the coding mechanism to apply information read from the record card at one of said sensing stations into the selected information area of the record card at the coding station, actuating means for moving the selected stop at said coding station out of the path of the record card to permit the record card to advance, and means responsive to a particular code read from the record card at the other of said sensing stations to prevent the movement of the selected stop out of the path of the record card at the coding station to thereby retain the record card for a succeeding cycle of operation of the coding mechanism.

13. An apparatus as set forth in claim 12 including means for advancing the cards from said first sensing station to said second sensing station in sequence, the sensing means at the first sensing station being operative to detect the record cards coded to initiate a repeat cycle of operation of the coding mechanism, means for moving the card stops at said first and second sensing stations out of the path of the record cards at the stations, whereby a record card coded to initiate a repeat cycle of operation of the coding mechanism is advanced from the first sensing station to the second sensing station, so that information contained in two succeeding record cards is impressed in the same information area of the record card at the coding station.

14. A control system for handling record cards comprising card sensing means to read information contained in a series of record cards fed thereto, a station to which a different series of record cards is fed, an operative mechanism at said station, a card stop to register a record card with respect to said sensing means, a card stop to register a record card with respect to said station, actuating means to move the card stop at the sensing means to release position, actuating means to move the card stop at the said station to release position, a series of cycle counting relays operative during each cycle counted to condition both of said actuating means for operation, and means for unconditioning for operation the actuating means which controls the release of the card stop at said station, whereby the record card at said station is retained for an additional cycle of operation of the operative mechanism at said station.

15. A control system as set forth in claim 14 including means for restoring the counting relays during any cycle in which both actuating means are conditioned for operation and in which the one actuating means is not unconditioned for operation.

16. A control system as set forth in claim 14 including a first relay operative to condition for operation the actuating means which releases the card stop at the card sensing means, a second relay operative to condition for operation the actuating means which releases the card stop at the said station, means controlled by said cycle counting relays for conditioning for operation electrical circuits to actuate said first and second relays, the said unconditioning means serving to uncondition for operation the electrical circuit which actuates one of said relays.

17. A control system as set forth in claim 16 including contacts controlled by said first and second relays for conditioning an electrical circuit which, when established, restores the cycle counting relays.

18. An apparatus for handling record cards which are divided into a plurality of information receiving areas, said apparatus comprising means for feeding the record cards in one direction in a given path of travel, a plurality of spaced apart stop means selectively movable one way into the path of travel to engage the record card and retain same against movement in said one direction to initially register the record card to present a predetermined area of the record card in a corresponding operative position, control means for selectively operating said plurality of stop means, means for moving the selected stop means in the opposite direction along said given path to move the record card and the information receiving area of the record card relative to said corresponding operative position, and means to move the selected stop means substantially the opposite way out of the path of travel of the record card to thereby release the record card.

19. An apparatus for coding record cards which are divided into a plurality of information receiving areas, said apparatus comprising a card coding station, coding mechanism at the station to apply information to a record card at such station, means for feeding one series of such record cards one way in a given path of travel to said station, a plurality of stops selectively operable for retaining one of said cards at different operative positions relative to said coding mechanism to present correspondingly different information areas of said one card to the coding mechanism, control means for selectively moving one of said stops substantially transversely into the path of travel of such cards to effect such retention at a corresponding one of said operative positions, actuating means for moving all of said stops in unison the opposite way to cause the selected stop to move such record card and the corresponding information area of the record card said opposite way relative to the coding mechanism for subsequent retention at another of said operative positions by another of said stops, a sensing station to which a different series of cards is fed, sensing means at said sensing station for sensing information from the cards of said different series, said coding mechanism being operative to reproduce in the corresponding information area of the card of said one series the information which is sensed by said sensing means, and means controlled by the information sensed from said sensing means to control operation of said actuating means, whereby information from said other series of cards can be reproduced into the same or different information areas of the cards of said one series.

References Cited in the file of this patent

UNITED STATES PATENTS

| | | |
|---|---|---|
| 2,290,827 | Thomas | July 21, 1942 |
| 2,699,210 | Perrin | Jan. 11, 1955 |
| 2,756,824 | Braun | July 31, 1956 |
| 2,812,940 | Kes | Nov. 12, 1957 |
| 2,862,555 | Jurgens et al. | Dec. 2, 1958 |

FOREIGN PATENTS

| | | |
|---|---|---|
| 508,954 | Great Britain | July 5, 1939 |